(12) United States Patent
Merewether et al.

(10) Patent No.: US 7,443,154 B1
(45) Date of Patent: Oct. 28, 2008

(54) MULTI-SENSOR MAPPING OMNIDIRECTIONAL SONDE AND LINE LOCATOR

(75) Inventors: Ray Merewether, La Jolla, CA (US); Mark S. Olsson, La Jolla, CA (US)

(73) Assignee: Seektech, Inc., San Diego, CA (US)

( * ) Notice: Subject to any disclaimer, the term of this patent is extended or adjusted under 35 U.S.C. 154(b) by 0 days.

(21) Appl. No.: 11/970,818

(22) Filed: Jan. 8, 2008

(51) Int. Cl.
*G01V 3/08* (2006.01)
*G01R 19/00* (2006.01)

(52) U.S. Cl. .............................. 324/67; 324/326
(58) Field of Classification Search ............... 324/326, 324/329–332, 66–67, 334, 22, 260–261; 166/252.2; 175/45, 61, 40, 48, 26; 702/188; 73/152.42, 50

See application file for complete search history.

(56) References Cited

U.S. PATENT DOCUMENTS

| 3,746,106 | A | 7/1973 | McCullough et al. |
| 3,975,735 | A | 8/1976 | McCullough et al. |
| 5,055,793 | A | 10/1991 | Mulcaney |
| 5,640,092 | A | 6/1997 | Motazel et al. .............. 324/326 |
| 5,754,049 | A | 5/1998 | Howell ......................... 324/326 |
| 2006/0181280 | A1 | 8/2006 | Mulcahey .................... 324/326 |

OTHER PUBLICATIONS

Goldak, Inc., Model 7200—Vavle Locator—2 pages, undated.
Goldak, Inc., Model 902—Sub-Scanner—2 pages, undated.
Goldak, Inc., Model 902—Split-Box—2 pages, undated.
Metrotech, 810—Pipe & Cable Locator—1 page, 2006.

*Primary Examiner*—Reena Aurora
(74) *Attorney, Agent, or Firm*—Michael H. Jester

(57) ABSTRACT

Portable locators are disclosed for finding and mapping buried objects such as utilities. A articulatable antenna node configuration and the use of Doppler radar and GPS navigation are also disclosed.

10 Claims, 18 Drawing Sheets

MULTI-SENSOR MAPPING OMNIDIRECTIONAL SONDE AND LINE LOCATOR

CROSS REFERENCE TO RELATED APPLICATION

This application claims priority from U.S. Provisional Application Ser. No. 60/508,723 of Ray Merewether et al. filed Oct. 4, 2003, and entitled "Multi-Sensor Mapping Omnidirectional Sonde and Line Locators and Transmitter Used Therewith," and U.S. Utility patent application Ser. No. 10/956,328, which was filed Oct. 1, 2004, of Ray Merewether et al. entitled "Multi-Sensor Mapping Omnidirectional Sonde and Line Locators," now issued as U.S. Pat. No. 7,336,078 granted on Feb. 26, 2008, the entire disclosures of which are hereby incorporated by reference.

FIELD OF THE INVENTION

The present invention relates to electronic systems and methods for locating buried or otherwise inaccessible pipes and other conduits, as well as cables, conductors and inserted transmitters, by detecting an electromagnetic signal emitted by these buried objects.

BACKGROUND OF THE INVENTION

There are many situations where is it desirable to locate buried utilities such as pipes and cables. For example, prior to starting any new construction that involves excavation, it is important to locate existing underground utilities such as underground power lines, gas lines, phone lines, fiber optic cable conduits, CATV cables, sprinkler control wiring, water pipes, sewer pipes, etc., collectively and individually referred to hereinafter as "utilities" or "objects." As used herein the term "buried" refers not only to objects below the surface of the ground, but in addition, to objects located inside walls, between floors in multi-story buildings or cast into concrete slabs, etc. If a back hoe or other excavation equipment hits a high voltage line or a gas line, serious injury and property damage can result. Severing water mains and sewer lines leads to messy cleanups. The destruction of power and data cables can seriously disrupt the comfort and convenience of residents and cost businesses huge financial losses.

Buried objects can be located by sensing an electromagnetic signal emitted by the same. Some cables such as power lines are already energized and emit their own long cylindrical electromagnetic field. Other conductive lines need to be energized with an outside electrical source having a frequency typically in a range of approximately 50 Hz to 500 kHz in order to be located. Location of buried long conductors is often referred to as "line tracing."

A sonde (also called a transmitter, beacon or duct probe) typically includes a coil of wire wrapped around a ferromagnetic core. The coil is energized with a standard electrical source at a desired frequency, typically in a range of approximately 50 Hz to 500 kHz. The sonde can be attached to a push cable or line or it may be self-contained so that it can be flushed. A sonde generates a more complex electromagnetic field than that produced by an energized line. However, a sonde can be localized to a single point. A typical low frequency sonde does not strongly couple to other objects and thereby produce complex interfering fields that can occur during the tracing. The term "buried objects" as used herein also includes sondes and buried locateable markers such as marker balls.

Besides locating buried objects prior to excavation, it is further desirable to be able to determine their depth. This is generally done by measuring the difference in field strength at two locations.

Portable locators that heretofore have been developed lack the functionality needed to quickly and accurately locate buried utilities.

SUMMARY OF THE INVENTION

According to one aspect of the present invention, a portable locator included at least one articulatable antenna support structure that permits a spacing or orientation between at least two antenna elements to be varied.

According to another aspect of the present invention, an antenna array includes an enclosure with a plurality of antenna elements in the form of coils. The array includes at least three mutually orthogonal coils mounted adjacent corresponding surfaces of the enclosure. The angles between the axis of each coil and a common antenna support structure are substantially equal.

According to another aspect of the present invention, a portable locator interprets low frequency emissions for navigation and low or high frequency emissions for locating buried objects.

DETAILED DESCRIPTION

Figure 1:
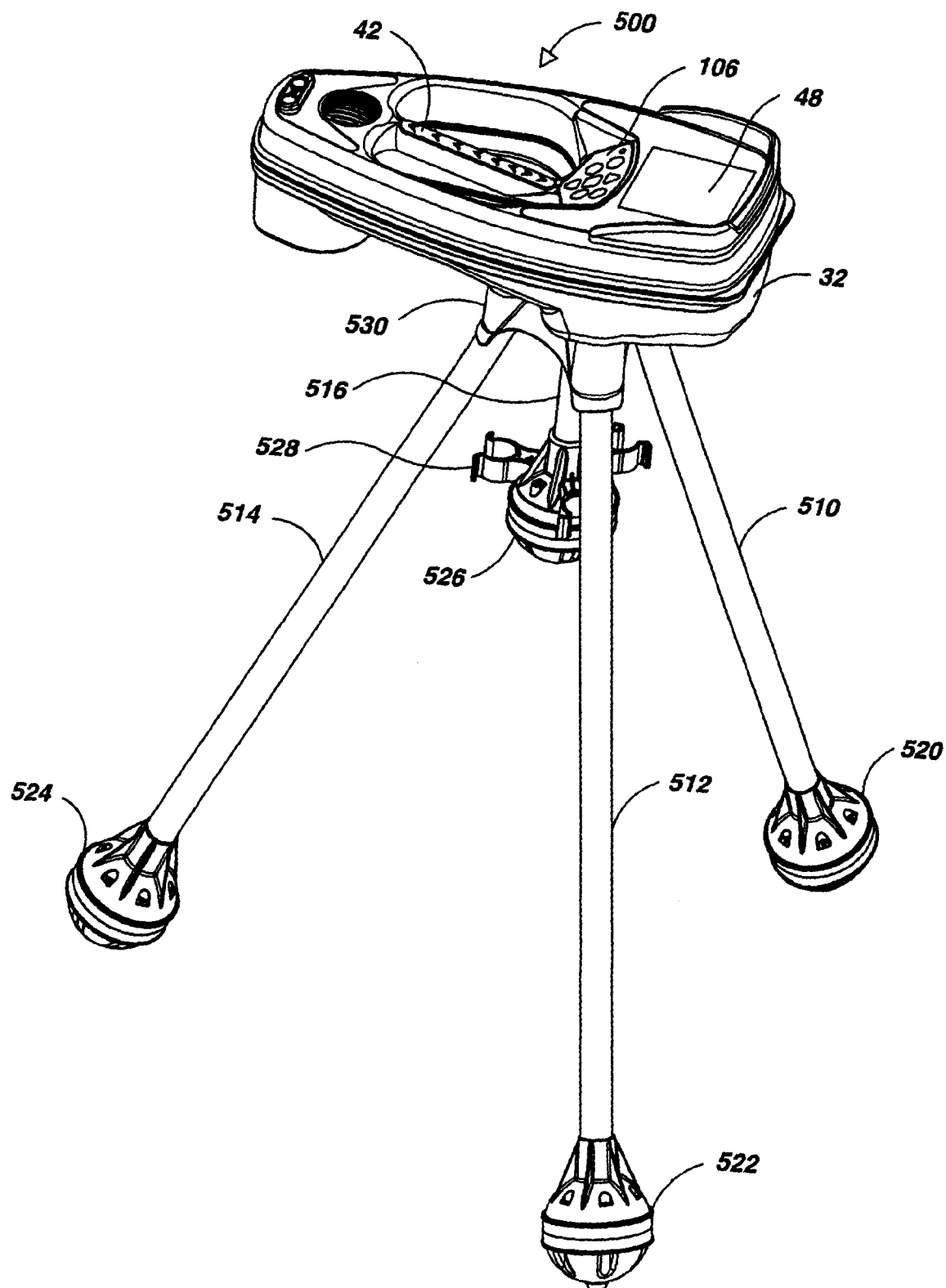
FIG. 1 illustrates a tripod locator with its legs extended.

The entire disclosure of co-pending U.S. patent application Ser. No. 10/308,752 of Mark S. Olsson, filed Dec. 3, 2002, and entitled "Single and Multi-Trace Omnidirectional Sonde and Line Locators and Transmitter Used Therewith," is hereby incorporated by reference.

The present invention provides an improved cable, pipe and sonde (dipole transmitter) locator that uses spatial measurement techniques for more efficient and accurate locating. The locator overcomes two key location problems. The first problem relates to locating sondes. Dipole transmitters (sondes) have a complex shaped "bar magnet" type of field. Measuring the flux vector (field line intensity and direction) does not indicate to the operator where the sonde is located underground. An additional complication in one of the properties of this type of field source is that the intensity in the direction of the N-S poles of the "bar magnet" is twice that of the field at the same distance in the direction of the equator (90° to the axis of the dipole). A further characteristic of a dipole sonde transmitter is that the field intensity (at distances large with respect to the length of the dipole source, far field) decreases as the inverse of the third power of distance ($1/R^3$). It has been standard locating practice for many years to assume that the sonde lies approximately horizontal to the earth's surface, and to find two locations (nulls), above ground where the field lines are vertical that occur in a plane aligned with the axis of the sonde approximately equally spaced on the surface of the ground. Using a single coil, horizontally oriented antenna these locations manifest themselves as signal nulls, often just called nulls. Much later art refers to these poles as "locate points." Using the same antenna, the area directly above the sonde is measured as a signal peak so long as the axis of the antenna is approximately aligned with the axis of the sonde. This is often referred to as locating a sonde using peaks and nulls.

While useful, this is an indirect locating approach. The poles or nulls are really artificial points that are not of direct interest. The goal of locating is to locate the sonde itself. In horizontal drilling applications as well as conduit locating, it is generally a good assumption that the axis of the sonde is nominally horizontal with respect to the earth's surface. The actual surface of the ground, above the sonde of course, can often be highly sloped. In locating drain lines, however, the piping often transitions vertically for short distances, making sonde location by the method of peaks and nulls impossible. Vertical sondes as well as highly sloped conduits or steep hillsides make sonde locating by the peaks and nulls method difficult, inefficient and often inaccurate.

The problems associated with cable and pipe locating are different. At first blush, the problem appears much simpler since straight line sources exhibit a simple cylindrical field shape where the intensity of the field diminishes as a simple inverse relationship to distance (1/R). The shape of the sonde field is far more complex, but it is typically discrete and largely undistorted. Low frequency sondes in particular have a very small amount of coupling into other adjacent field conductive objects. In the cable locating world, however, to some degree, everything couples to everything, and cables are often not straight and singular. In many cases, field shape (the direction of the flux vector at a single point in space) correlates rather poorly with the actual positions in the ground of the objects of interest. The present invention allows the three dimensional properties of the field to be measured, offering large improvements in the accuracy and efficiency of locating cables and pipes in the congested environments typically encountered.

As an improvement to existing locators, our improved locator measures the electromagnetic field emitted by a cable, pipe or sonde throughout a spatial volume, in order to determine not only the direction of the field lines but also the gradient of field intensity. This improved locator collects a much greater amount of measured field data in real time, this combined with more advanced processing techniques can also be used to directly calculate an estimated object geometry and position.

Existing locators measure field direction and rely on the operator to move the locator within the work area to search for areas of greater field intensity. One embodiment of our improved locator can directly measure direction from the operator, in which the field intensity is increasing. Another embodiment of our improved locator continuously determines its position relative to the search coordinate system (local navigation), thus allowing field measurements in time to be spatially related one to another. This allows the locator to also determine the three dimensional properties of the field using as few as three field sensors while tracking the movement of these sensors through the locating workspace. Another embodiment of our improved locator combines these techniques of using a volumetric antenna array, combined with local navigation, to allow even greater locating accuracy and efficiency to be achieved.

Multiple antennas are placed within a three dimensional volume to allow the volumetric properties of the field to be measured. Measurement of the volumetric properties of the field allows the true position of the object of interest to be more accurately estimated. The antennas can be any device capable of sensing an electromagnetic field, examples include but are not limited to air coils, coils wound on cores typically iron or ferrite, or other magnetic field sensors, GMI, GMR, flux gate, etc.

The antennas can be clustered into mutually orthogonal sets of three sensors. Due to the availability of a large amount of processing power, however, there is no requirement for the sensors to be grouped in orthogonal sets, and these antenna sensors can be alternatively distributed individually in space and a resultant field solution can be calculated. Various calculation techniques can be used, one example of which is maximum likelihood.

A practical problem to overcome is that locators are portable hand held instruments and a large enclosed volume can be expensive to manufacture, and impractical to store and carry. Two preferred embodiments of our invention offer solutions to this problem.

One preferred embodiment of our locator uses an improved novel antenna support geometry based upon a sphere. We will refer to this as a gradient antenna node. Volumetrically, in terms of surface area to volume, a sphere is the most efficient geometry. In the role as a mounting structure, surface area relates to the weight of the complete structure. As the size and numbers of antenna support structure increases, the importance of keeping weight at a minimum becomes paramount in a portable, hand held instrument. In this embodiment we employ large diameter air coils orthogonally placed on the inside surfaces of a sphere. These would be typically manufactured as two mating hemispheres. Geometrically, this is equivalent to the six orthogonal faces of a cube enclosed within a spherical shell. Coils mounted on the opposite faces of the virtual internal cube are coaxial. The signals from coaxial coil pairs can either be summed to optimize for maximum sensitivity or subtracted (differenced) so that the vector component of the field intensity gradient in the direction of the coil axis can be determined. It is not necessary to populate all six internal positions. To reduce cost and weight, only three orthogonal positions need to be populated with coils. An alternate embodiment populates one internal orthogonal set of three coils with wire sizes and turn numbers optimized for higher frequencies (typically fewer turns) and the other set with coils optimized for a lower frequency range.

The enclosure for the coils need not be exactly spherical. In an alternate embodiment, the faces of a sphere corresponding to the plane of each mounted coil are flattened into a more cubic configuration. An externally spherical configuration will be generally stronger, but a sphere with flattened faces will be more compact. A further advance of placing the coils on the inside surfaces of the supporting spherical shell provides a maximum amount of internal space for additional sensors and supporting electronics.

Figure 2:
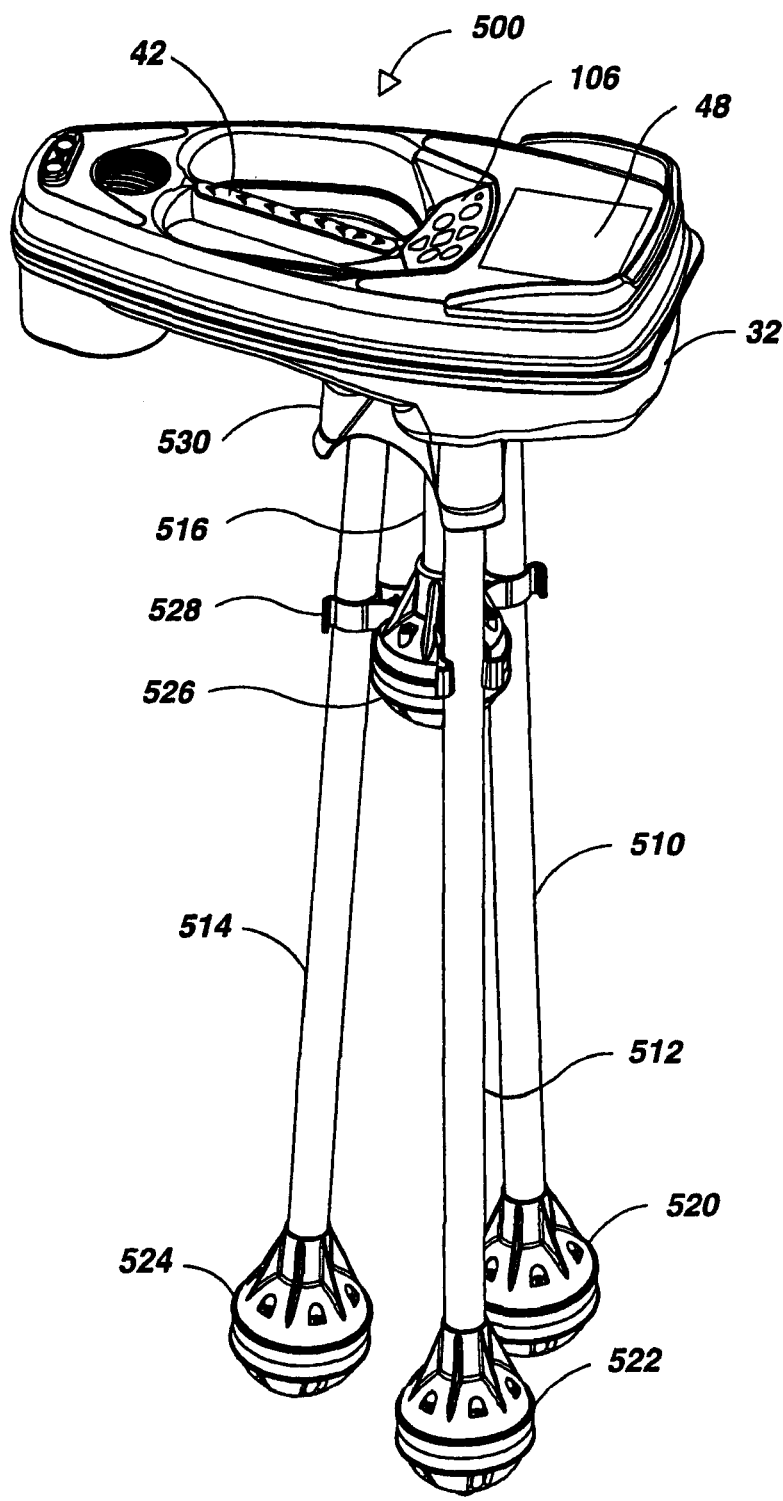
FIG. 2 illustrates the tripod locator with its legs closed.
Figure 3:
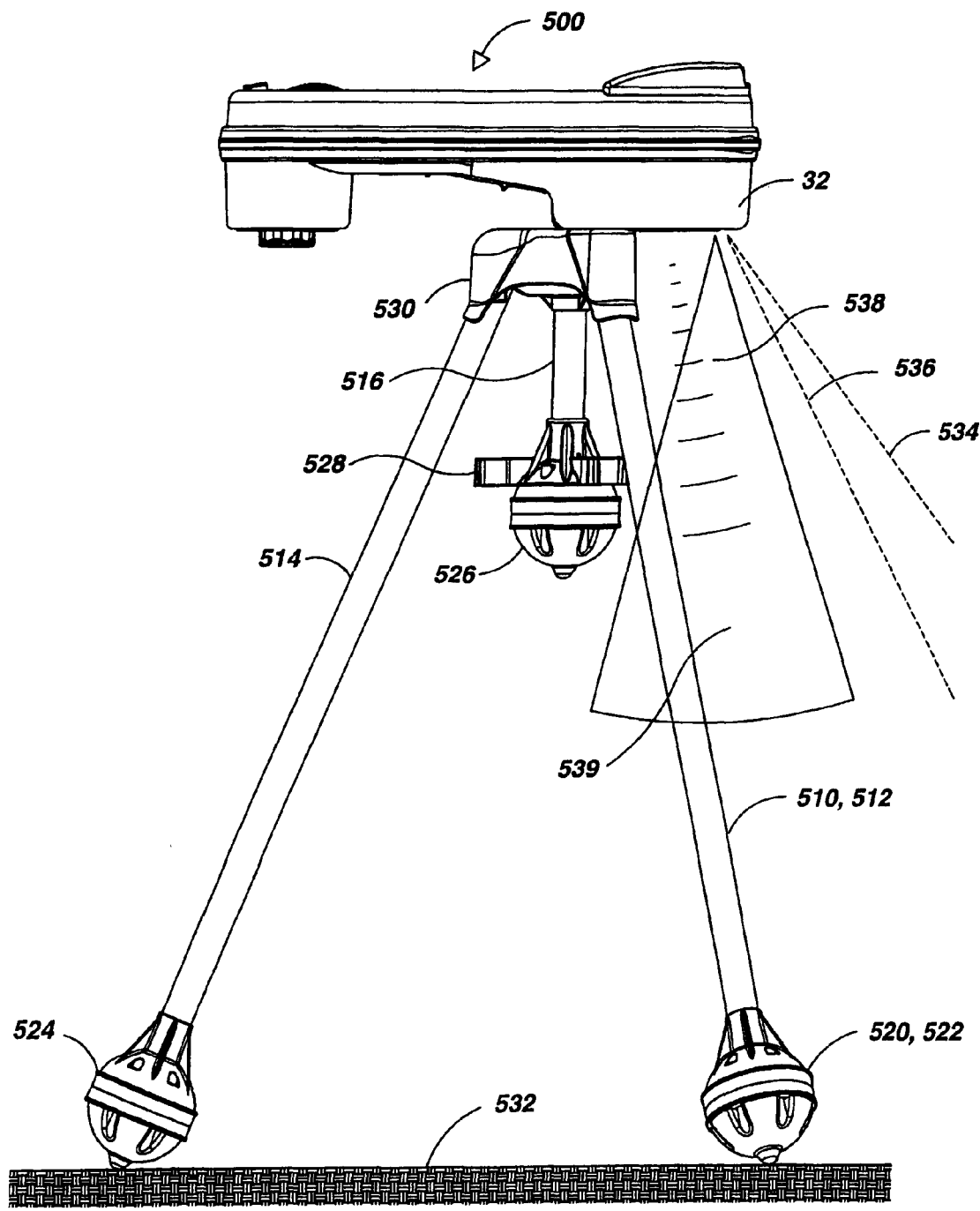
FIG. 3 is a side elevation view illustrating the tripod locator with its legs open, sitting on the surface of the ground and illustrating Doppler NAV based in the main case of the unit.

Referring to FIGS. 1-3, a tripod locator 500 incorporates three antenna sensors or nodes 520, 522 and 524 mounted on the ends of foldable or articulatable legs or supports 510, 512 and 514 allowing these sensors to be positioned within a three dimensional volume. A fourth sensor or node 526 is positioned near the upper support point of the tripod. The antenna node 526 is carried on a central leg or support 516. In the particular embodiment illustrated in FIGS. 1-3, the antenna nodes are approximately positioned at the corners of a tetrahedron. At least two of the three legs of the tripod are foldable to allow for use or storage in a more compact configuration. The locator 500 is designed to be carried by hand by an operator in the field at a work site. As such, the antenna sensors must not interfere with the operators ability to walk safely, unimpaired. Preferably, one leg opens rearward within the plane of the handle of the instrument, while the other two legs of the tripod open forward in front of the operator, approximately 60° from this central plane, to the operator's left and the right. This configuration is easy for the operator to carry and operate.

The upper ends of the supports 510, 512 and 514 are pivotally connected to a common pivot base 530. Snap retainers 528 on support 516 releasably hold supports 510, 512 and 514. The tripod configuration has the additional advantage of allowing the operator to place the locator 500 in an upright fixed position on the ground. In this mode of operation, the locator can monitor and track the movement of signaling devices, for example, a dipole transmitter located in a horizontal drilling head. This also allows the locator to remain in a fixed location during a period of time during GPS position acquisition.

The tripod locator 500 of FIG. 1 could be used to measure the slope of a drain line by positioning the locator near the line to be measured and pushing a sonde along the pipe through this region. The fixed locator can precisely track the sonde's movement in three dimensions and thereby determine if the line has proper drainage slope. The tripod locator 500 (FIGS. 1-3) has a housing 32 with a handle portion 42 that encloses most of its electronics. The housing 32 has a handle portion 42 that extends between a rear battery enclosure portion of the housing 32 and a forward main portion of the housing 32. The supports 510, 512, 514 and 516 connect to the main portion of the housing 32. The batteries serve to counterbalance the supports. A keypad 106 and display 48 are mounted in the housing 32 as best seen in FIGS. 1 and 2. FIG. 2 shows the locator of FIG. 1 with the legs shown closed for storage or transport, or for use in a more compact form. As best seen in FIG. 3 the sensors 520, 522 and 524 rest on the surface of the earth 532. Doppler radar emissions are illustrated diagrammatically in FIGS. 3 and 534. Laser beams are illustrated diagrammatically at 536, ultrasonic waves are illustrated diagrammatically at 538, and optional imaging is illustrated diagrammatically at 539.

The performance of our locating system can be further improved and enhanced by adding the ground navigational capability. Various navigation techniques can be employed. Examples include, GPS, DGPS, inertial navigation, optical flow (using a camera linear array, optical motion processor or other optical technology), Doppler techniques, and the use of navigational reference beacons. With sufficiently accurate navigation, a local map of the detected objects can be stored in the locator, either for use by the operator in the field, or for download into a data system such as a GIS (Geographic Information System). Kalman filtering or similar techniques can be used to integrate various navigational sensors for improved accuracy. For accurate utility mapping, a spatial resolution of substantially less than one meter is needed and will often not be available from GPS (shadowed by or inside buildings, under tree cover, etc.). A more accurate and robust local navigation scheme is needed to complement GPS techniques.

With a sufficient number of non-coplanar, spaced apart antennas, and sufficient signal strength, the position and orientation of a sonde relative to the locator 500 can be accurately determined. The reverse can also be true. If one or more sondes are fixed and not moving, these sondes can be used as reference beacons to locally navigate the locator 500 with respect to the position of one or more fixed beacons. When using multiple sondes for locator navigation, each sonde can operate at a unique frequency or use another coding method, e.g., TDM, to allow the mapping locator to uniquely distinguish the signal from each sonde. Lower frequencies are desirable to avoid signal coupling into nearby objects and resultant navigational errors. An over-sampled system is desirable. Examples include: a single vertical sonde plus a compass; two vertical sondes, working on one side of a base line running from one sonde to the other; three vertical sondes in an approximate triangular configuration; one or more pairs or triads of collocated horizontally oriented orthogonal (crossed) sondes.

A GPS can be integrated to be part of the navigational sonde beacon. If two beacons are used these can be used in "leapfrog mode" to keep the position of one tied to the next. The GPS positional information can be transmitted directly via radio or other means either to the locators or the drilling controller at the drill rig control station. Alternately, the GPS or other positional information can be encoded or modulated onto the transmitted sonde Beacon signal. The relative positional information changes very slowly (drift), or intermittently when the beacon or locator is moved to a position, so the needed data rates for updating changes are low. Beacons that transmit intermittently conserve battery power.

Similar to how an optical mouse operates, an image can be used to track the movement of the locator over the ground. Additionally, images of the ground can be stored for later retrieval. Additionally, a large photomosaic of the work area can be assembled from these images, either in real time or post-processed. Image collection can be employed with non-optical flow navigation schemes to provide information for assembling individual images into a large mosaic of all areas traversed by the operator.

Capabilities that can be added or associated with navigation includes:
1) Ground Penetrating Radar (GPR);
2) Acoustic tomography (geophones in leg tips, using drilling noise to build obstruction images); and
3) Conductance tomography (electrical conductance probes in leg tips).

A two axis tilt sensor is preferably included in the locator 500. A three axis tilt sensor could be advantageous in some applications. An earth referenced magnetic compass may also be desirable. The user places the tripod locator 500 above the target drilling location and simply steers the drilling system towards it. Multiple receivers can be used to limit the amount of operator repositioning activity. The transmitter in the drill head can be used as a continuous position reference when moving a receiver. Importantly, this system does not require pitch or yaw information to be transmitted from the drill head. Nor does it require that the drill string move forward to allow multiple measurements to be made with the drill head transmitter at various positions in space to reduce the number of unknowns to allow the transmitter position to be determined. Nor does it require that the signal strength of the transmitter be known. Each receiver can have an IP address, and utilize a longer range TCIP type of communication protocol. This facilitates the use of a conventional portable computer as a drilling control console.

Our multi-sensor locator 500 allows the drilling control system to calculate and steer to any target point in space within the detection range of the unit compared to the "flux pathline steering procedure." Longer legs and larger opening angle can be used for a fixed mount type of receiver. Greater separation can yield greater accuracy. Our multi-sensor locator 500 can easily establish an accurate initial magnetic bearing of the drill at the beginning of the drilling process. Crossing cables can be located and displayed similarly by conventional and direct measurement techniques. Our invention allows use of lower cost transmitters that do not require pitch and roll information.

Separate frequency transmitters can allow greater pitch measurement resolution. Using the known distance, e.g., ten feet, between the transmitters emitting at slightly different frequencies, the locator 500 can compensate for skin effect errors. The two frequencies should be similar so that propagation in the earth is effectively identical. Also if pitch and roll data do not need to be transmitted, then very low frequency sondes, with essentially no skin effect error can be utilized. The spaced apart sensor array of FIG. 1 also allows skin depth correction. Separated sondes also have the effect of increasing the locate range of the drill string. Great pitch precision can be obtained with a good separation. It is possible to duty cycle the trailing sonde to extend battery life and make it easier to justify having a second location for a sonde in the drill string. Our tripod locator 500 with tilt sensors, maps the local slope of the surface of the ground when it is placed upon the ground to make measurements.

GPS accuracy and coverage in urban settings may be substantially improved by providing artificial GPS satellites (pseudolites) that can be placed at corner markers, permanent natural features, building entrances, or other semipermanent features. Pseudolites may also be placed in relatively open areas at a location surveyed by DGPS/WAAS or traditional means to tie a mapping locator survey into more global coordinates. A pseudolite or theodolite total station may include image acquisition and processing means so that a similar pseudolite or theodolite with image acquisition ability may be accurately positioned in the same place in a separate survey.

In a region of space, free of electrical current and approximately free of displacement current, the curl of the magnetic field is also approximately zero. In that case, only five components of the magnetic gradient and three magnetic magnitudes at each frequency are needed to closely approximate the actual field. In a region of space near many conductors carrying synchronous currents, more components are needed to characterize the field. In particular, it is reasonable to map how quickly the first order gradients are changing in three dimensions. Such measurements may be made by providing first order gradiometers in antenna nodes as opposed coil pairs, providing coil pairs with independent channels and performing addition and subtraction in hardware, firmware, and/or software, and/or providing precise three dimension navigation of simple multiple coil antennas. If each node in the tetrahedral tripod locator contains coil pairs capable of being processed as first order gradiometers, the differences in the outputs of said gradiometers and the distances between then may be used to estimate second order gradients. Such gradient information is useful for characterizing horizontal, tilting, and even vertical pipes and utilities. Maps of magnetic intensity, first order gradients, and higher order gradients to measure field curvature may advantageously be used to characterize regions with multiple electromagnetically interacting utilities and pipes. It is not necessary to resolve the outputs of the plurality of magnetic sensors into gradients and orthogonal magnitude components to effect an inversion solution of the location of the pipes and utilities. Methods such as the Nelder Mead simplex algorithm can work directly in the vector space of coil output voltages and phases. Displaying maps of higher order gradients will help an operator of the mapping locator interact with the device to resolve particularly complicated situations.

Image based navigation and path documentation may be accomplished at a relatively low frame rate by cross correlating successive images. If the cross correlation peak is near the origin, one of the frames may be discarded to save memory. Alternatively, the two frames may be registered and then merged to enhance resolution. Such image processing may be accomplished in a combined image acquisition and image processing device or by a separate processor operating on the output of an imaging device. Methods of image enhancement may include but are not limited to bicubic interpolation, directional edge interpolation, or interpolation by anisotropic diffusion. Image frame sequences may be used to tie survey areas in navigation satellite shadows and multipath regions to traditionally surveyed corner marker grids and/or multipath free GPS locations.

The amount of time and memory required to cross correlate images for navigation purposes may be substantially reduced by cross correlating sub-areas, such as the corners, of one image with the other image. Selection of sub-areas in both images for cross correlation may be guided by raw information from navigation sensors or from the output of a Kalman navigation system. The location of the peaks in the cross correlations of successive images may in turn be fed into a Kalman filter as estimators of the mapping locators trajectory and orientation changes in three dimensional space.

Cross correlation may be performed on pixels. At high frame rates, sub-pixel resolution may be obtained by the methods of optical flow analysis. Alternatively cross correlation may be performed on objects. Objects may be identified by repeatedly applying erosion and dilation operators to image data, color matching, or by texture analysis using methods such as windowed Fourier transforms, Short time Fourier Transform (STFT), or Gabor transform analysis.

Stored image data may be transferred to another processor on an excavator or other earth working machinery for direct viewing by the operator as verification of correct location and orientation for digging, drilling, and/or grading. Overlaying one or a plurality of images as partially transparent layers over an opaque comparison image is a display mode usable by machine operators for position and orientation registration. Cross correlation of transferred images with stored and current image data allows registration of apparently featureless surfaces such as asphalt or concrete and apparently random surfaces such as sandstone or fine grain rocks.

Other instruments such as Ground Penetrating Radars (GPR), gravimeters, seismometers, geophones, magnetometers, gradient magnetometers, gas chromatography mass spectrometers, gradient magnetometers, cone penetrometers, and electromagnetic induction detectors may also be equipped with Kalman navigation systems and optical imaging devices. Stored image data may be transferred between such devices to coordinate mapping of subsurface features to hundreds of meters in depth. Alternatively, images, navigation data, and measurement data may be transferred to an independent processing means for data fusion operations. Such fused data is useful for environmental site remediation planning and assessment, construction planning, and utility planning.

A preferred embodiment of our design aligns the long axis of the external mounting support with two of the corners of an internal "virtual cube." This provides space to allow structure to be added to the spherical shells for mechanical support as well as allow wires or other data transmission means to enter the interior space of the aspherical shell without interfering with the coils. If the coils are slightly reduced in size, this geometry also allows a supporting member to pass through the shell for greater mechanical strength, or to allow an additional antenna set (node) to be mounted along another section of the same support member. This further has the important property that all of the coils within the spherical shell are exactly at the same angle with respect to the long axis of the supporting member. This can be extremely important in terms of facilitating the calibration of the sensitivity of each coil relative to the others in the array. The mating plane of the two hemispherical shells is preferable normal to the axis of the antenna node support member, but many other orientations can also be used.

Figure 4:
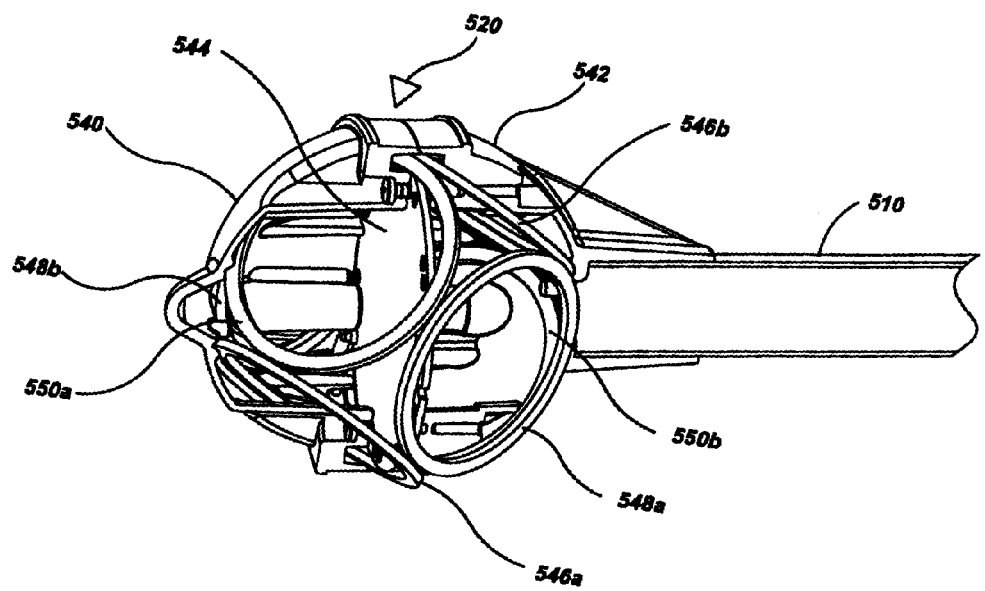
FIG. 4 illustrates an antenna node with six coils.
Figure 5:
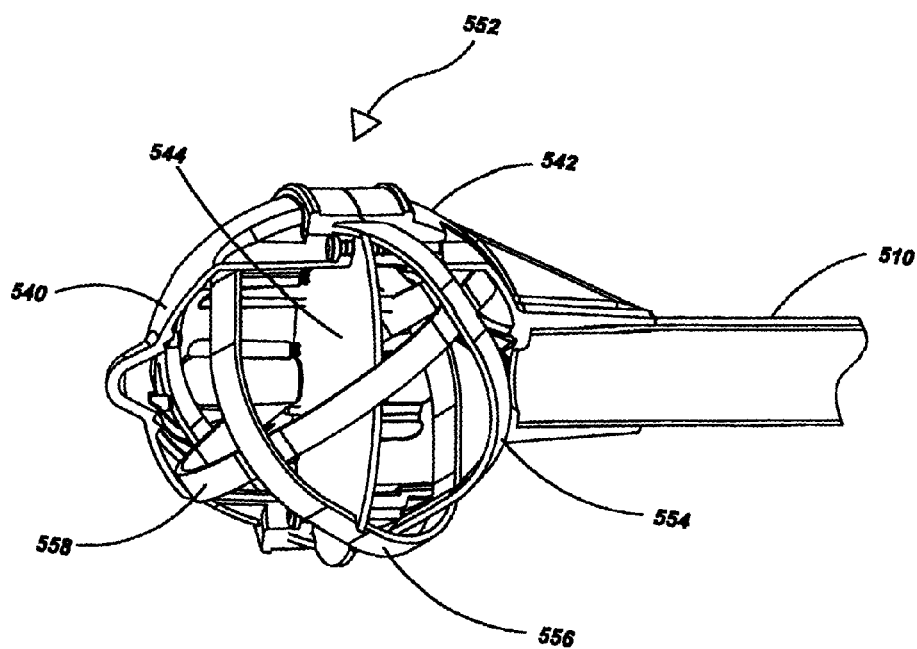
FIG. 5 illustrates an antenna node with three coils.

As illustrated in FIGS. 4 and 5, the spherical enclosure can be designed as two mating halves with a planar interconnecting element placed approximately at the mating plane of the two halves. The interconnecting element is preferably a printed circuit board 544. This allows the use of a socket and pin interconnect means to each hemisphere if the coils are mounted directly to the insides of the hemispheres. The coils can be mounted to a separate internal structure enclosed by approximately hemispherical shells.

In the node 520 illustrated in FIG. 4, six coils are arranged orthogonally in alignment with the sides of a cube so that they can fit within a spherical shell of halves 540 and 542 connected to a tubular node support 510. The coils include a first opposing pair of coils 546a and 546b, a second opposing pair of coils 548a and 548b, and a third opposing pair of coils 550a and 550b. In the node 552 illustrated in FIG. 5, three coils 554, 556 and 558 are orthogonally arranged within the spherical shell made of halves 540 and 542. In both the nodes 520 and 552, the angle between the axis of each coil and the axis of the support 510 is substantially the same. The coils illustrated are all identical and deformable to nest inside each other. A first coil is installed in the desired location, and a second, deformable coil is then installed orthogonal to the first so that it crosses over (or inside) of the first coil. A third, identical coil is installed over the first two so that it is orthogonal to both of the first two. There are two key advantages to this approach; one is lower costs due to using a single, unique part; and two, and even more importantly, all of the coils are electrically identical and have essentially the same frequency response. The deformation introduces only a very small difference in the sensitivity of each coil.

Figure 6:
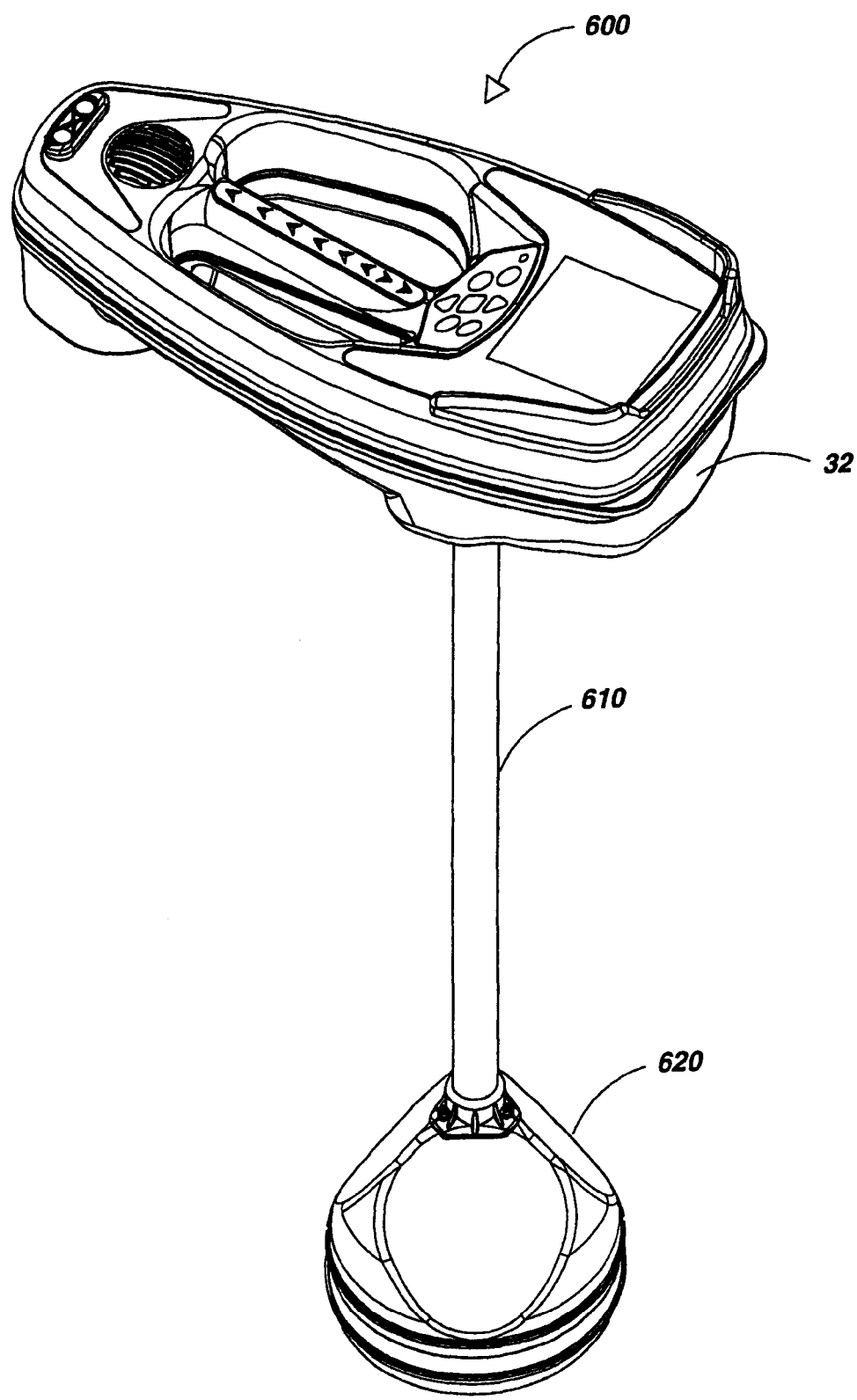
FIG. 6 is a perspective view of a coil gradient pair locator.
Figure 7:
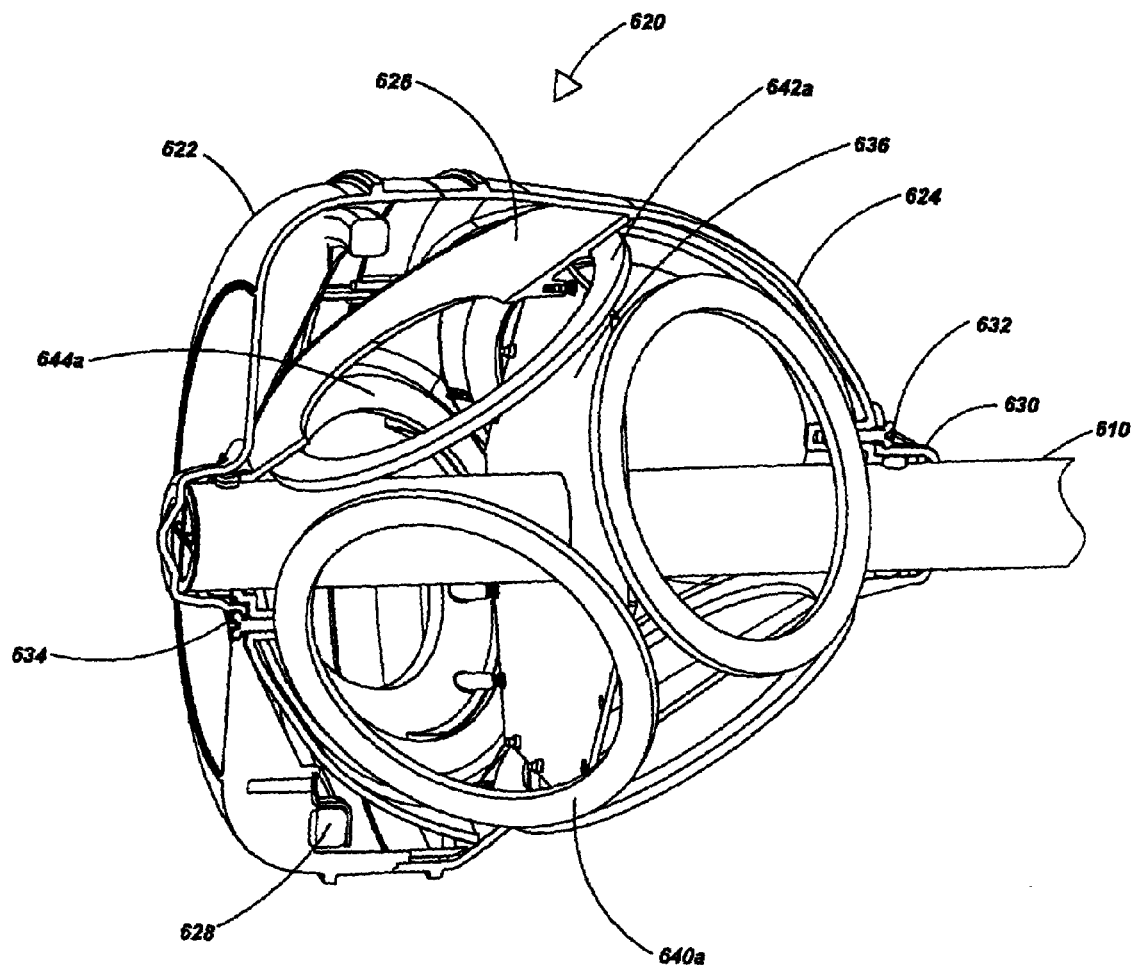
FIG. 7 illustrates an antenna node gradient pair.

FIGS. 6 and 7 show a version of the antenna node 620 in which the faces of the sphere corresponding to the plane of each mounted coil have been flattened into a more cubic configuration. An externally spherical configuration will be general stronger, but a sphere with flattened faces, with be more compact. In FIG. 6, a coil gradient pair locator 600 has the node 620 attached to the lower end of an elongate support whose upper end is attached to the housing 32.

In FIG. 7, the node 620 that is connected to support 610 includes shells 622 and 624, secured via top retainer 630 and screws 632 and 634. A PCB 636 supports circuitry. Inner supports 626 hold coils of pairs 640a, 640b, 642a, 642b and 644c, 644b. A large transmitter/receiver coil 628 is also included.

Figure 8:
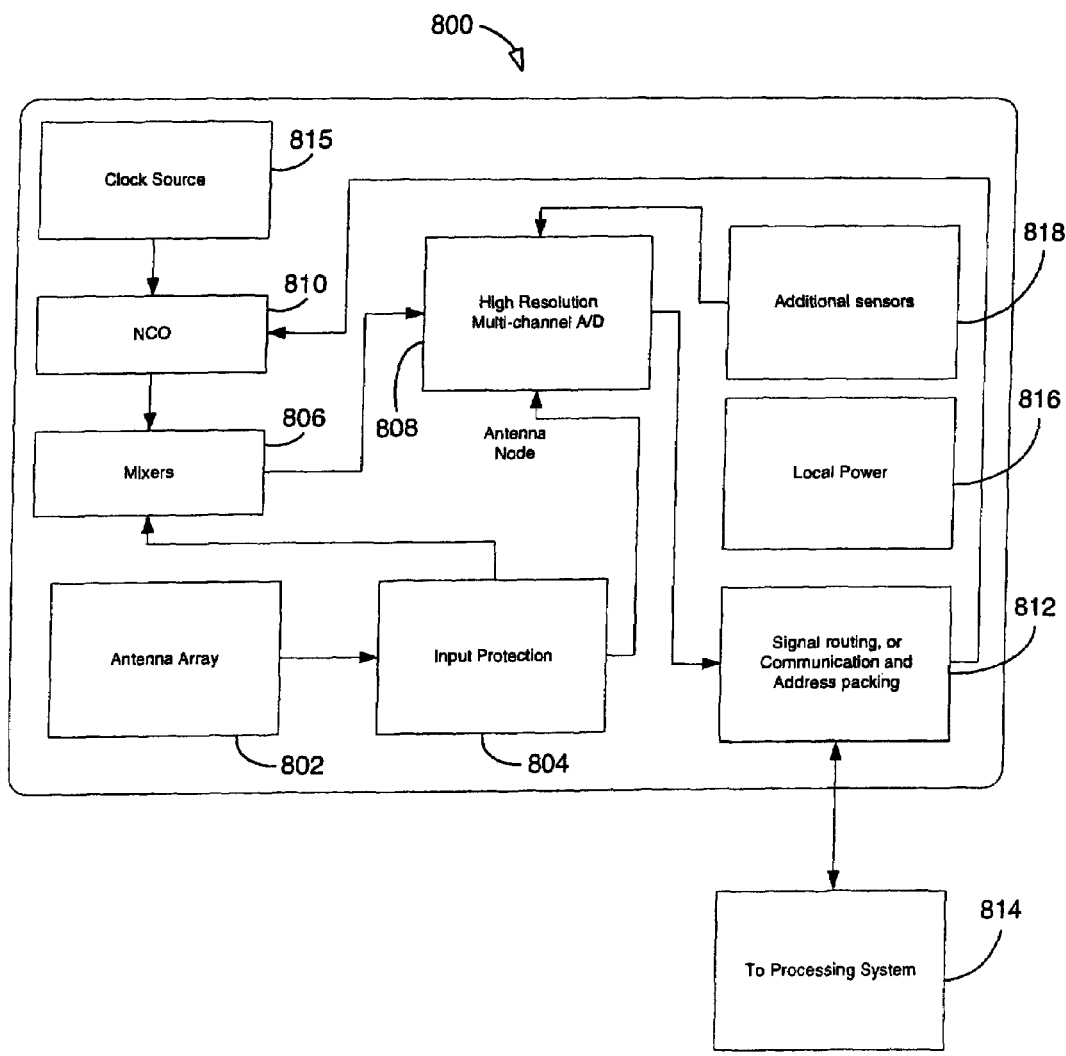
FIG. 8 is a block diagram of a circuit for processing signals from an antenna node.

FIG. 8 is a block diagram of a circuit 800 for processing signals from an antenna node. Signals from an antenna array 802 are fed through an input protection circuit 804 and to mixers 806 and to a high resolution multi-channel analog-to-digital (A/D) converter 808. The mixers 806 receive input from a numerically controllable oscillator (NCO) 810 controlled by a signal routing, or communication and address packing circuit 812 connected to a processing system 814 inside the housing 32. The NCO 810 receives timing signals from a clock source 815. The NCO can be a traditional oscillator, or a temperature compensated oscillator or an oven controlled oscillator, or could be referenced from a portable atomic clock module, or a clock derived from a GPS. This would allow for narrower filters, better phase comparison, lower drift, etc. Local power is provided through a circuit 816 and additional sensors 818 provide input into the A/D converter 808.

Figure 9:
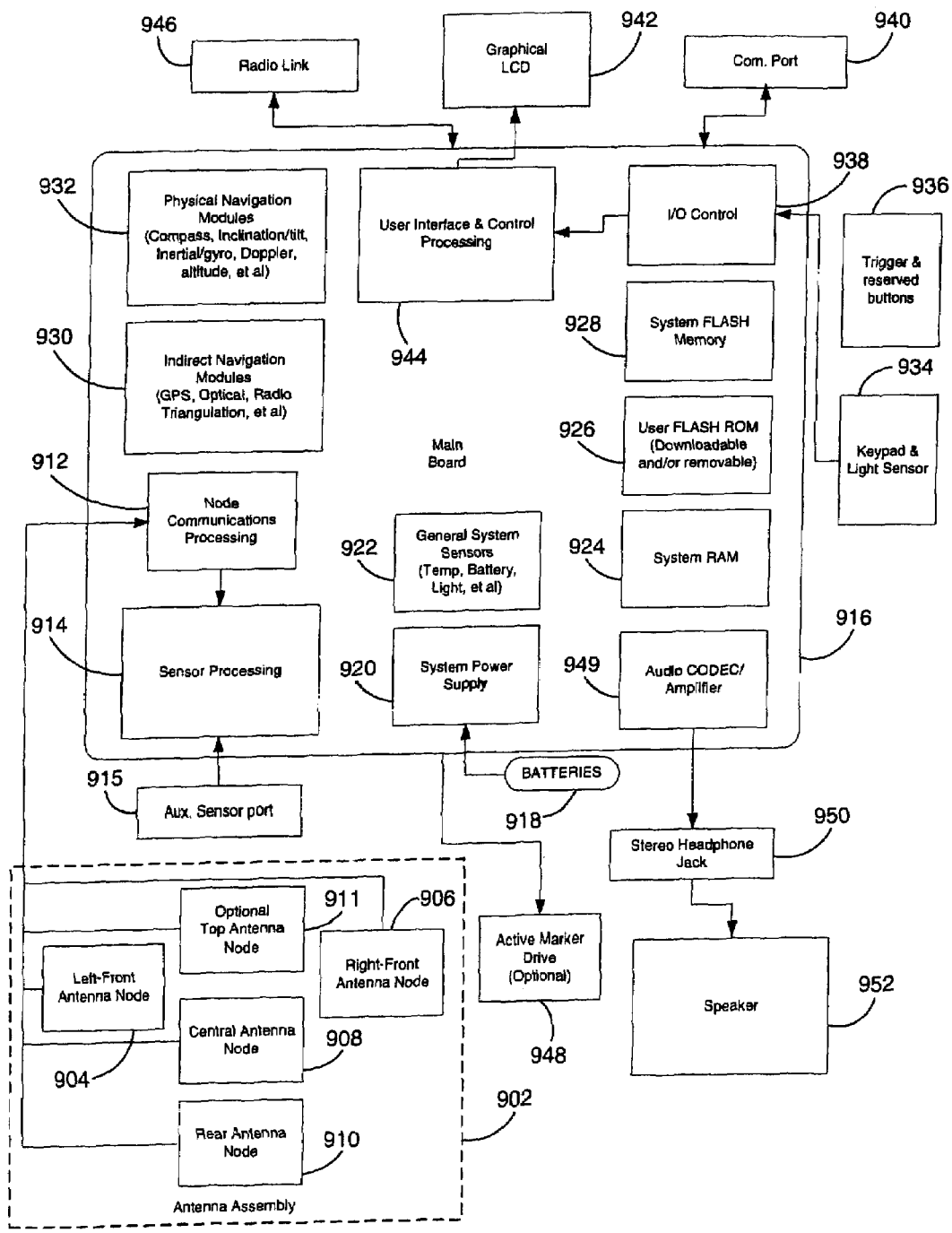
FIG. 9 is a block diagram of a portable locator.

FIG. 9 is a block diagram of a portable locator in accordance with the present invention. An antenna assembly 902 includes a left front antenna node 904, a right front antenna node 906, a central antenna 908 and a rear antenna node 910. The antenna assembly can include an optional top central antenna 911. Signals from the antenna assembly 902 are fed to a node communications processing circuit 912 which in turn feeds a sensor processing circuit 914. The sensor processing circuit 914 also receives inputs from an auxiliary sensor port 915. Both the node communications processing circuit 912 and the sensor processing circuit 914 are located on a main printed circuit board 916 located within the housing 32. Batteries 918 mounted within the housing 32 are connected to a system power supply 920 on the main circuit board 916. The main circuit board 916 also supports general system sensors such as temperature, battery level, light level, etc., which are indicated diagrammatically at 922. The main circuit board 916 also includes system RAM 924, user flash ROM 926, and system flash memory 928. Indirect navigation modules 930 such as GPS, optical, radio triangulation, etc., are also supported on the main circuit board 916. Physical navigation modules 932, such as a compass, inclination/tilt sensor, inertial/gyro Doppler radar, altimeter, etc., are also supported on the main circuit board 916. A keypad and light sensor circuit 934 are mounted in housing 32. Trigger and reserve push buttons 936 are also mounted in the housing 32. The circuit 934 and the buttons 936 are connected to an input/output control circuit 938 mounted on the main circuit board 916. A communications port 940 is also connected to the input/output control circuit 938. A graphical liquid crystal display 942 mounted in the housing 32 is driven by a user interface and control processing circuit 944. A radio link 946 is also connected to the main circuit board 916. An active marker drive circuit 948 is connected to the main circuit board 916 and is used to excite buried markers. An audio amplifier 949 on the main circuit board 916 can drive either headphones (not illustrated) through a headphone jack 950 or a speaker 952.

Figure 10:
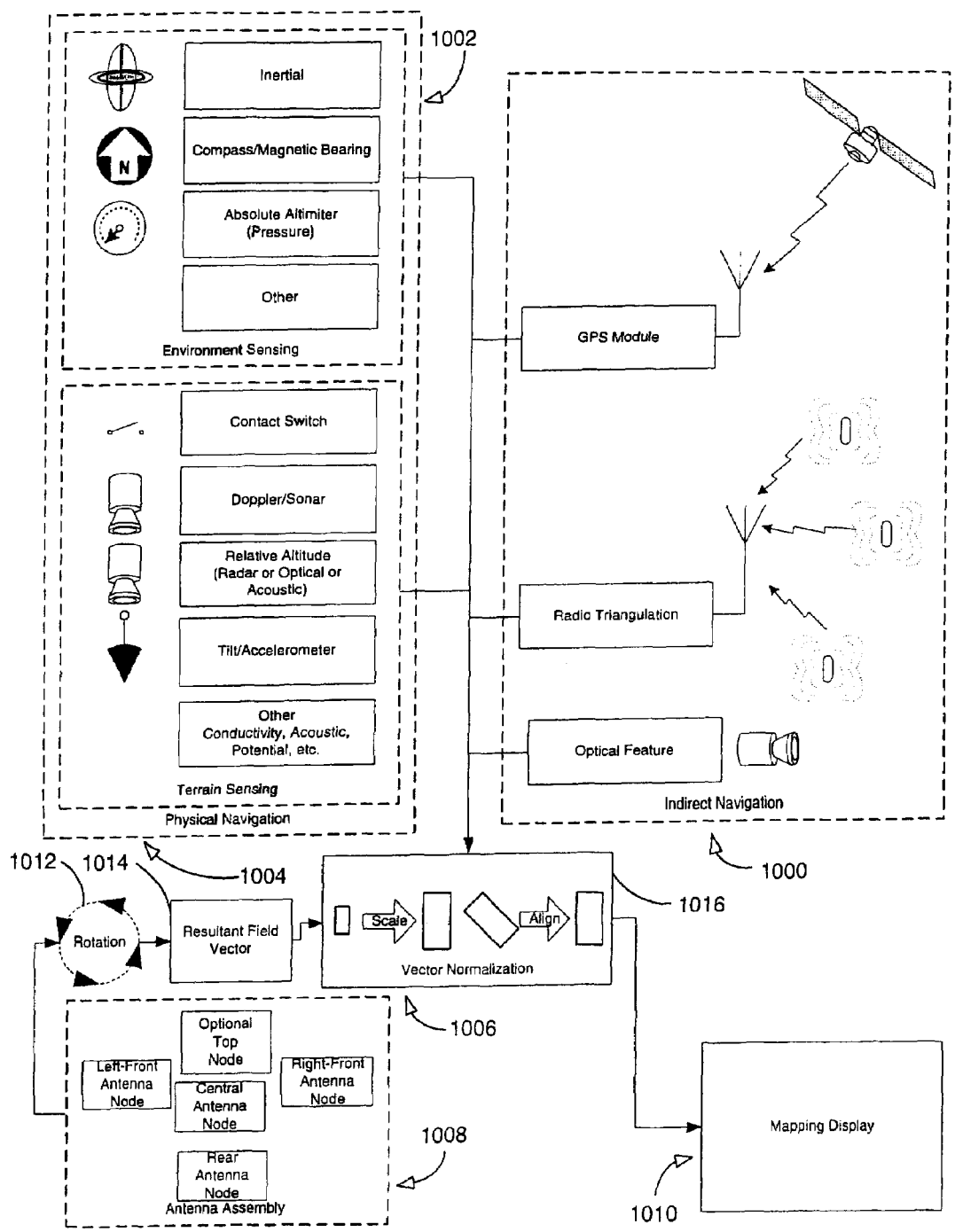
FIG. 10 is a block diagram of a locator system with enhanced processing capabilities.

FIG. 10 is a block diagram of the locator system with navigational capabilities. An indirect navigation module 1000, an environmental sensor 1002 and a terrain sensing module 1004 provide input to a vector normalization module 1006. Vector normalization module 1006 receives input from an antenna assembly 1008. The locations of underground utilities are indicated on a mapping display 1010.

A fundamental problem in portable locators is that the user's motion is convolved with the received signal. To perform near optimal filtering, the effects of motion need to be deconvolved before applying the nominal matched filter or, alternatively, the structure of the filter needs to be substantially modified to incorporate the motion inputs.

In a typical usage, a portable locator is swung side to side or around in a large arc to find an initial direction to a buried utility. Even in the case of following a buried utility, small deviations in path may result in phase reversals of the signals in those antennas in antenna assembly 1008 which are aligned so that their sensitive axis is approximately perpendicular to the local magnetic flux lines. In general, the sensitivity of any antenna is proportional to sine of the angle between its sensing axis and the local flux lines. If the sensing axis is aligned with local flux lines, the sine of the angle is zero and that particular antenna is insensitive. Prior art portable locators have not attempted to correct for this effect.

The first order correction is to form a times series of vectors with the outputs available from an single node in the antenna array 1008 and to use angle change information from the physical navigation sensor suites 1002 and 1004 to rotate the time series of vectors into a rotation free frame of reference before those signals are applied to filters. The filters used depend on the signal being traced. Traditional portable locators have used very narrow band filters. User motion has placed a limit on the minimum bandwidth in the filters. Rotating the antenna output vector time series allows the use of narrower filters for improved detection range. At large ranges, the signal varies very slowly with changes in range and a narrower filter is more desirable. In a broadband locator, very similar issues are relevant. If the user's rotational motion is significant on the time scale of the code length used, the matched filter will see significant de-correlation and a loss of output amplitude will occur. Again, if the signals are rotated to a stationary frame before application to the matched filters, significant improvement in detected signal strength is seen. In a preferred embodiment, each node in antenna array 1008 produces three orthogonal signal components. For each of these nodes the first step is to rotate the three signal components into components aligned with the system axis used by the navigation sensors 1002 and 1004. This is an ordinary matrix multiplication. The second step in the preferred embodiment is to use roll, pitch and yaw signals for the navigation suites 1002 and 1004 to form a matrix operator that rotates signals in the portable locator frame of reference into an earth referenced frame. In most applications, the utilities, navigation beacons, and jammers are stationary in the earth-referenced frame. Signals referenced to that frame may be advantageously processed by considerably narrower filters. These matrix multiplications may be performed in block fixed point or floating point in a general purpose processor, digital signal processor, or custom hardware accelerator. Subsequent filtering and processing in block 1016 may be in the same physical processor in a second DSP.

A second level of correction is possible. In any particular orientation of the antenna assembly 1008, some of the antennas will be closer to the buried utilities, some will be closer to navigation beacons, and some will be closer to inferring sources or "jammers" than other antennas. Again, user motion will modulate, or be convolved with, the desired signals from the utilities and navigation beacons and will also modulate the interfering sources. This modulation spreads the spectrum of both the desired and undesirable signals and makes their separation in the following filters more difficult.

The translational and angular information from physical navigation sensor suites 1002 and 1004 may be used with the known physical configuration of the assembly 1008 to transform the signal vectors into a quasi-stationary frame before being processed by the matched filters. This procedure minimizes the amount of bandwidth spreading and signal distortion caused by user motion which in turn allows better resolution of the utility and beacon signals and rejection of the interfering signals.

Figure 11:
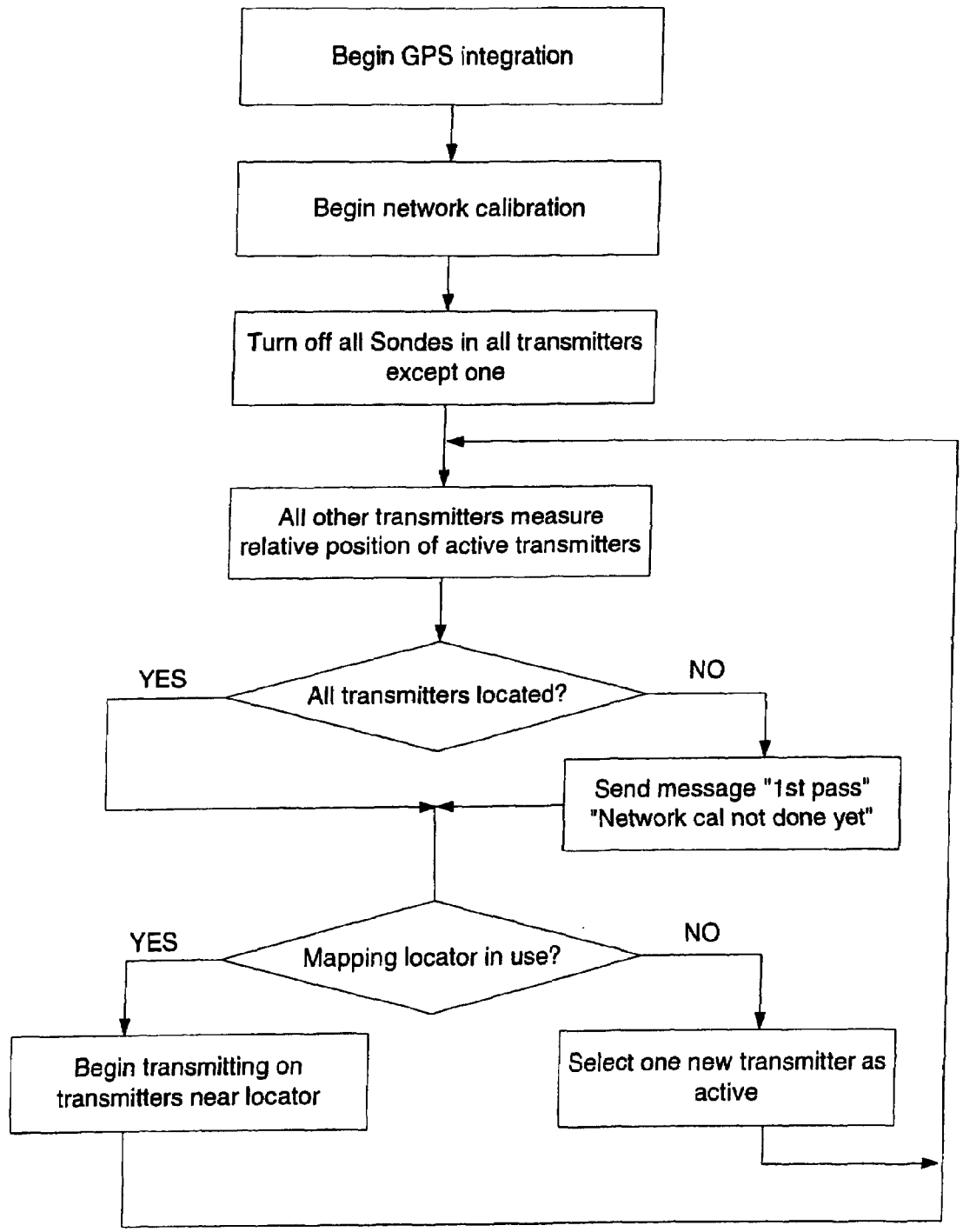
FIG. 11 is a flow diagram illustrating a method of transmitter location calibration.

FIG. 11 is a flow diagram illustrating a process of transmitter location calibration. In the case that more than one sonde beacon is used in a local survey, the beacons can be provided with a mechanism to self calibrate their relative positions. Each beacon needs a receiving antenna array much like that used in the portable locator antenna assembly 1008. Each beacon can also contain a GPS receiver. As each beacon is placed in the field and turned on it begins to integrate the time series of GPS fixes it receives. In addition, the beacons will turn on their internal receiving antenna nodes to calculate the relative positions of the other beacons. The integrated GPS and relative position information can be modulated onto the beacon signals, modulated onto a local infrared or radio net, or incorporated into pseudolite transmissions for use by other beacons and the portable locator. The beacon network self calibration can proceed in the absence of a portable locator. A least squares fit of all of the integrated GPS locations and relative position information from the beacons is saved with time stamps for subsequent use by a portable locator. Once mapping location is begun, further refinement of the relative position least squares fit is performed using data on the position of each of navigation beacons relative to the portable mapping locator.

Figure 12:
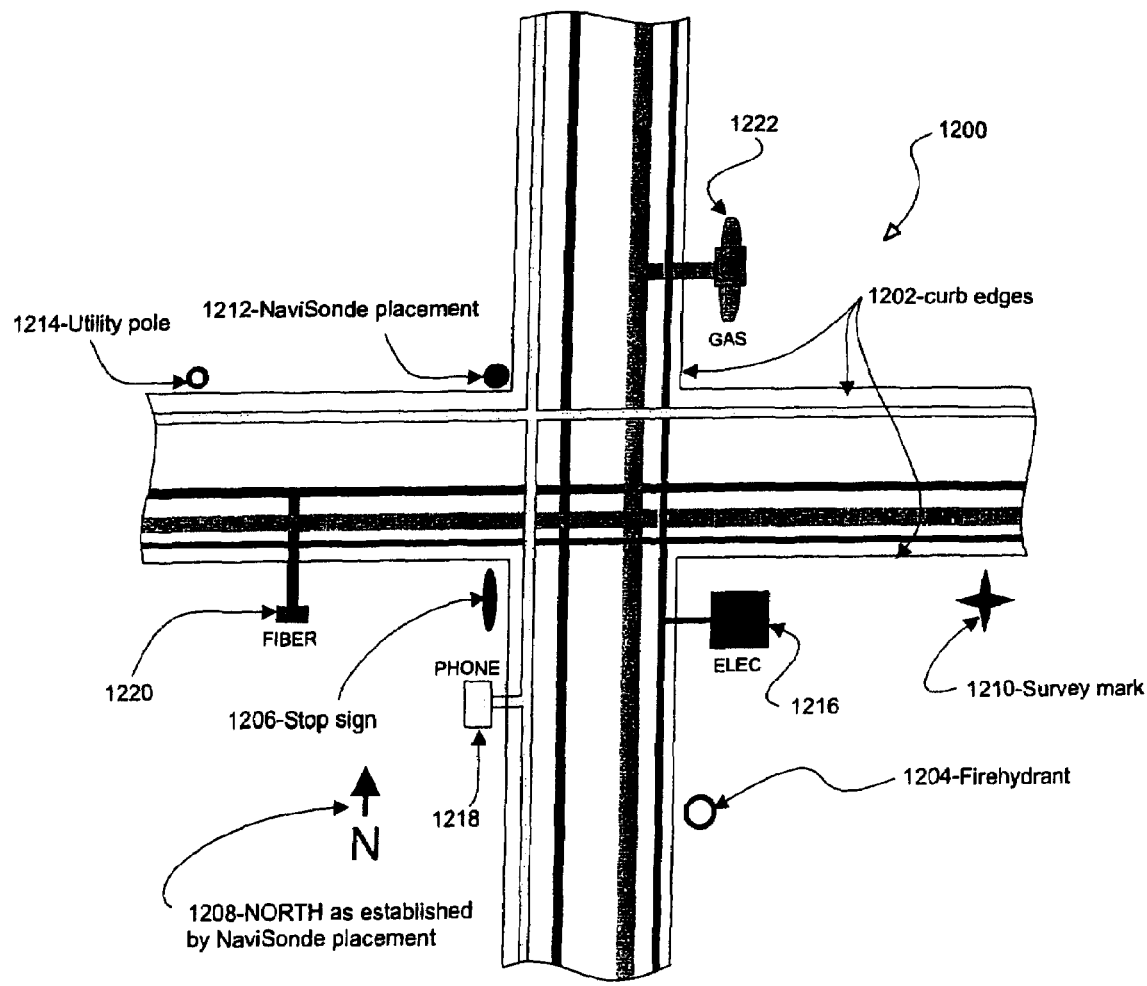
FIG. 12 illustrates an underground utilities map generated with a locator.

One important problem our mapping locator solves is the ability to record or transmit utility positional data collected in the field so that this information can be used to create, update or improve Geographical Information System (GIS) maps. FIG. 12 illustrates an example of such a map 1200 that can be generated directly in the mapping locator or built from recorded data during incorporation into a mapping software utility.

In FIG. 12, curb edges 1202 of an intersection of roads are represented graphically. The same is true of a fire hydrant 1204, stop sign 1206, North direction as established by a sonde placement 1208, a survey mark 1210, another sonde placement 1212, a utility pole 1214, an electrical box 1216, a phone box 1218, a fiber optic terminal box 1220 and a gas meter 1222. Gas, electric phone and fiber optic lines running parallel with the streets are also represented.

Utility owners have maps indicating the locations of their utilities, both buried and overhead. These maps are often incomplete or inaccurate, at least to the level needed to support construction activities. Existing requirements for locating utilities prior to digging and construction are limited by the capabilities of the instruments available to perform these locates. For example, one existing requirement is to place marks within two feet of the true position of the buried utilities, with no requirement at all to note depth. While on site, the personnel performing the locate typically use colored paint to mark hard surfaces or stakes with colored flags to mark soil. This is typically the sole method by which the results of the utility locate are communicated to the construction personnel. However, stakes are easily moved, and paint is considered unsightly and may last a short time. Currently, there is no easy way to either audit the locating process or provide a permanent electronic data record of each locate, and repeat construction typically requires repeat locates. Because millions of locates are performed in the United States each year, it would be of great value if this information was available to continually improve GIS maps. Providing construction personnel with a map of the site, either printed or even downloaded into a mapping locator onsite for use during the construction process, would reduce errors and subsequent damage and injury.

Typically, conventional GPS is only accurate to 3-10 meters. This is completely inadequate for buried utility construction activities where relative positions between buried utilities are often less than one meter, and utility crossing separations may be on the order of tens of centimeters vertically. Greater accuracy is needed. In urban settings around large structures, GPS may not be available, and accuracy may be further distorted by multi-path effects. DGPS techniques using post processing or more sophisticated field equipment can, in some cases, increase precision to decimeter levels, but it appears unlikely that such techniques can be readily employed in many typical urban settings. GPS techniques will play an important role in the use of our mapping locator to tie the locate into a global coordinate system to varying degrees of precision.

A related problem is that locating errors are common, and a great deal of property damage and injuries related to utility strikes during construction occur each year. The various configurations of our mapping locator offer many improvements and will greatly improve locating accuracy. The old saying "garbage in, garbage out" applies with respect to putting information into databases. It is important that accurate information is placed into GIS systems, or these errors themselves can later result in damage during construction, if relied upon. Perhaps of equal importance is being able to estimate the quality of data recorded. Since it is collecting data over an area in a known spatial relation, our mapping locator allows the accuracy of the data to be estimated, and potential interferences and distortions to be readily seen of the patterns in the data recorded. Undistorted data will match a cylindrical field model for a straight conductor, but distorted data will not. Data qualification can be done in real time in the field, post processed in the field at the end of the locate when a complete data set is available, or post processed at a later time, such as during the process of GIS incorporation or merge. Knowing when the collected data is invalid or likely to be in error due to non-simple multiple fields interacting is critically important when determining whether other techniques such as alternate (typically lower) frequencies, common ground isolation or even potholing, may be required to establish accurate utility location. Perhaps the greatest pitfall of non-mapping, non-omni-directional locating techniques is that the operator may not have any indication that the indicated locate is bad due to field distortion or interference. Mapping cannot completely eliminate this concern, but it can dramatically reduce this uncertainty.

Locating utilities with respect to other permanent, identifiable objects in the area of concern is extremely useful. It is important to understand that our mapping locator can also map objects that do not emit any signals, which we is referred to as "tracing mode." Very simply, this is a mode where the user requests the mapping locator record a point or track and then optionally tags that point or track with some identification. Reference objects in the field might include curb edges, sidewalk or pavement boundaries, signs, poles, utility cabinets, building corners, fire hydrants, survey markers, etc. The ability to incorporate into the locating map such other features recorded during the locating process allows the position of the mapped utilities to be referenced at a fine scale to important way points in the local coordinate system. The trace mapping point can be defined with respect to the mapping locator in any convenient location. Typically, the trace mapping point would be the center of the mapping locator's local coordinate system, and would, therefore, be placed at the center of the lower antenna node or at the midpoint of a multiple node lower antenna array.

Some cities have a need to map all of their assets into a GIS database. A mapping locator can collect some of this additional data to a relatively high degree of precision.

Trace mode could be initiated with a trigger pull, a key press, or a voice command or any other input means. Trace object identification could be selected from a preset list stored in the instrument. Audio recorded with a microphone during tracing can assist with tagging objects later on while incorporating the locate data into a GIS map, and simply requires that the operator state what was being traced and other pertinent information, such as pole number or survey marker number. Audio compression techniques or voice recognition techniques can improve the efficiency of this process. Audio allows more complex information to be recorded in the field for later transcription, whereas the use of a keyboard can be more efficient during post processing of the locate data in preparation for database merge. Our mapping locator can be designed to accept a keyboard, touchpad, mouse or other device, such as a USB trackball, for field data entry. Our mapping locator can also be designed with an integrated joystick, micro-track ball or personal digital assistant (PDA) touchpad (Graffiti, hand writing recognition) input to facilitate adding additional information such as street names, job site, employee ID, etc.

Positional data can be recorded continuously throughout the locate. The start and endpoints of traced reference objects can simply be tagged in sequence as part of this stream of position data. Alternatively, separate data files for each traced object might be created with associated compressed audio files for later specific identification. Objects are traced in three-dimensions (3D) so vertical relief items, such as poles or vertical building edges, will stand out in the mapping data set, even without any associated annotation or tag. To allow a complete audit of the locate, the position of the line transmitter utility connection and grounding points can be measured. The tracing frequency in use on each utility can, of course, be recorded as a data component of the mapping information. The simultaneous use of multiple transmitters on various utilities as described in our co-pending application (U.S. Ser. No. 10/308,752) can be used to improve the efficiency of the locating process and allow simultaneous locating of multiple utilities.

Our mapping locator can also be used as a surveying tool. Depending on the types of navigational sensors employed, sub-centimeter resolution is readily achieved. For example, within a range of several meters of a three-axis navigational sonde beacon, a relative resolution on the order of 1 mm can be achieved. This capability allows 3D points to be quickly and efficiently mapped. Our mapping locator can operate as a 3D digitizer for use in the field. An example usage would be collecting data on an existing structure for remodel construction where original drawings, especially 3D, do not exist.

A navigational sonde beacon can be affixed to a service vehicle, which is advantageous if greater beacon power is needed to allow larger areas to be mapped. This configuration can also save operator time as no specific deployment of a beacon is needed if the service vehicle can be parked adjacent to the work area. A roof or bed mount configuration, in combination with a low frequency navigation signal, minimizes field distortions due to the ferromagnetic properties of the vehicle. In this mapping configuration, it would be advantageous to incorporate a GPS, a compass and a tilt sensor into the beacon, or adjacently on the vehicle, in a fixed orientation to the beacon. A further enhancement to this vehicle mounted beacon configuration is to have the mapping locator simply stream positional, field vector and target annotation data continuously to a data logging system in the vehicle, such as a laptop computer.

Similar to tracing mode, our mapping locator can readily incorporate sonde position data into the recorded map, and thereby, map the position of non-conductive tubes. If a four node mapping locator is used, it can be set in place and the sonde inserted, moved and mapped through a hollow conduit, such as a fiber optic conduit or a sewer pipe. Using either a single or dual antenna node mapping locator, for example, in combination with the three-axis navigation sonde beacon herein disclosed, the sonde position could be mapped incrementally while stopped in increments along the conduit. In this instance, the operator can be required to move the mapping locator during the process of locating each increment along the pipe or conduit. If the orientation of the sonde is in fixed alignment and the motion of the sonde is purely linear, then this requirement may be relaxed.

Versions of our mapping locator using four or more antenna nodes can track a moving sonde, while said locator is moving relative to a fixed navigation beacon. Tracking a floating sonde would allow the path of a flow line to be mapped. In such a manner the piping from a house to a septic tank, for example, might be mapped. Municipal sewer systems could be similarly mapped, either with a hand carried or vehicle mounted mapping locator tracking a floating or crawler powered transported sonde. With synchronized clocks, the position of a data collecting autonomous sewer vehicle (ASV) could be tracked allowing untethered operation. Simple, low bandwidth data, or messages such as "I'm Stuck," might be sent with the sonde signal. Even with traditional, tethered robotic crawler cameras, more accurate positional and depth information would be available if the camera vehicle was tracked with one of our mapping locators. This is similar to the horizontal drilling problem, but is unique and different in that the position of the moving locator itself is being mapped while simultaneously mapping the position of a fixed or moving sonde.

There are some applications where it is desirable for a vehicle to track a buried wire. Our mapping locator provides this capability and can precisely show the offset position of the vehicle relative to the track wire.

Figure 13:
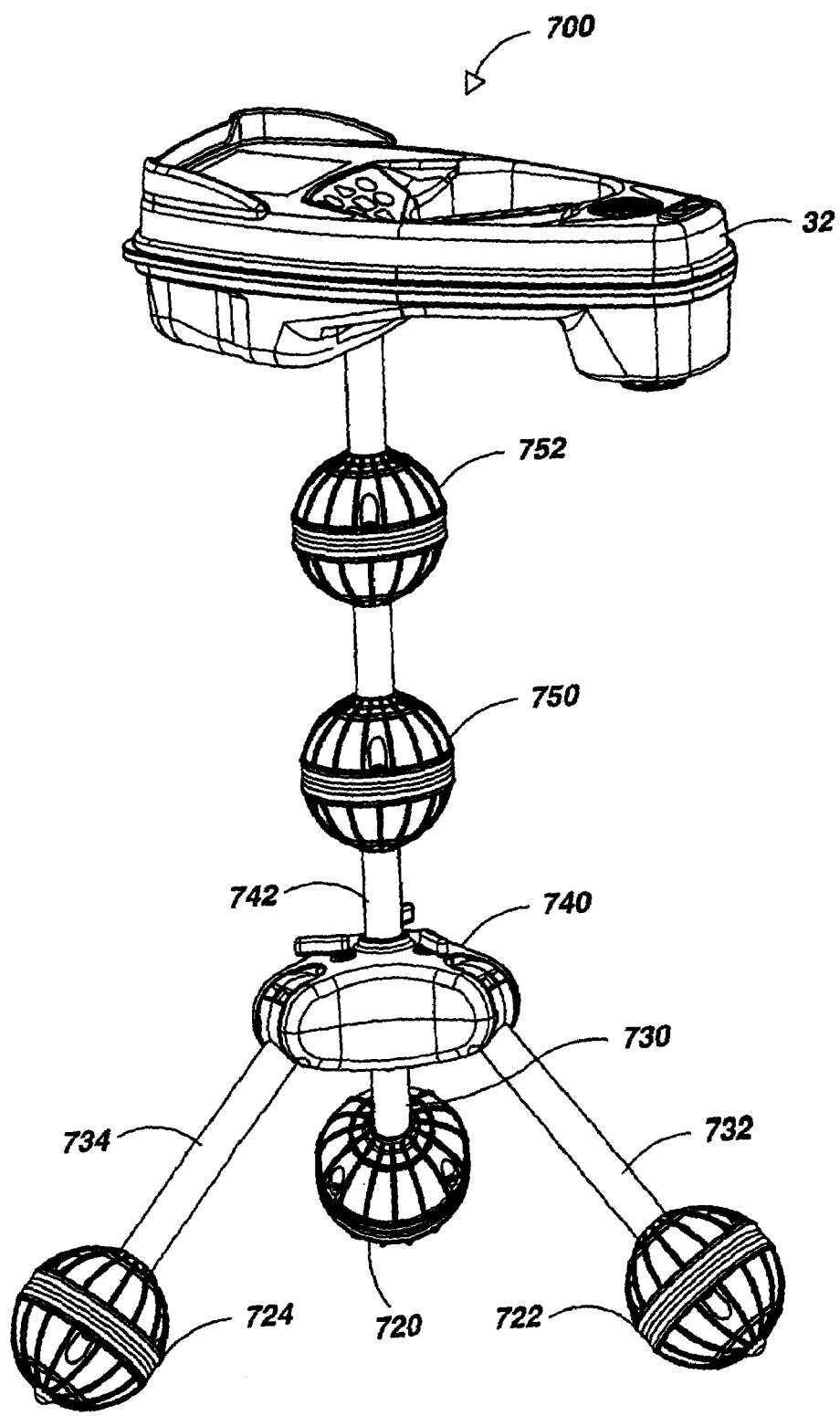
FIG. 13 illustrates an alternate tripod locator configuration in an unfolded state.
Figure 14:
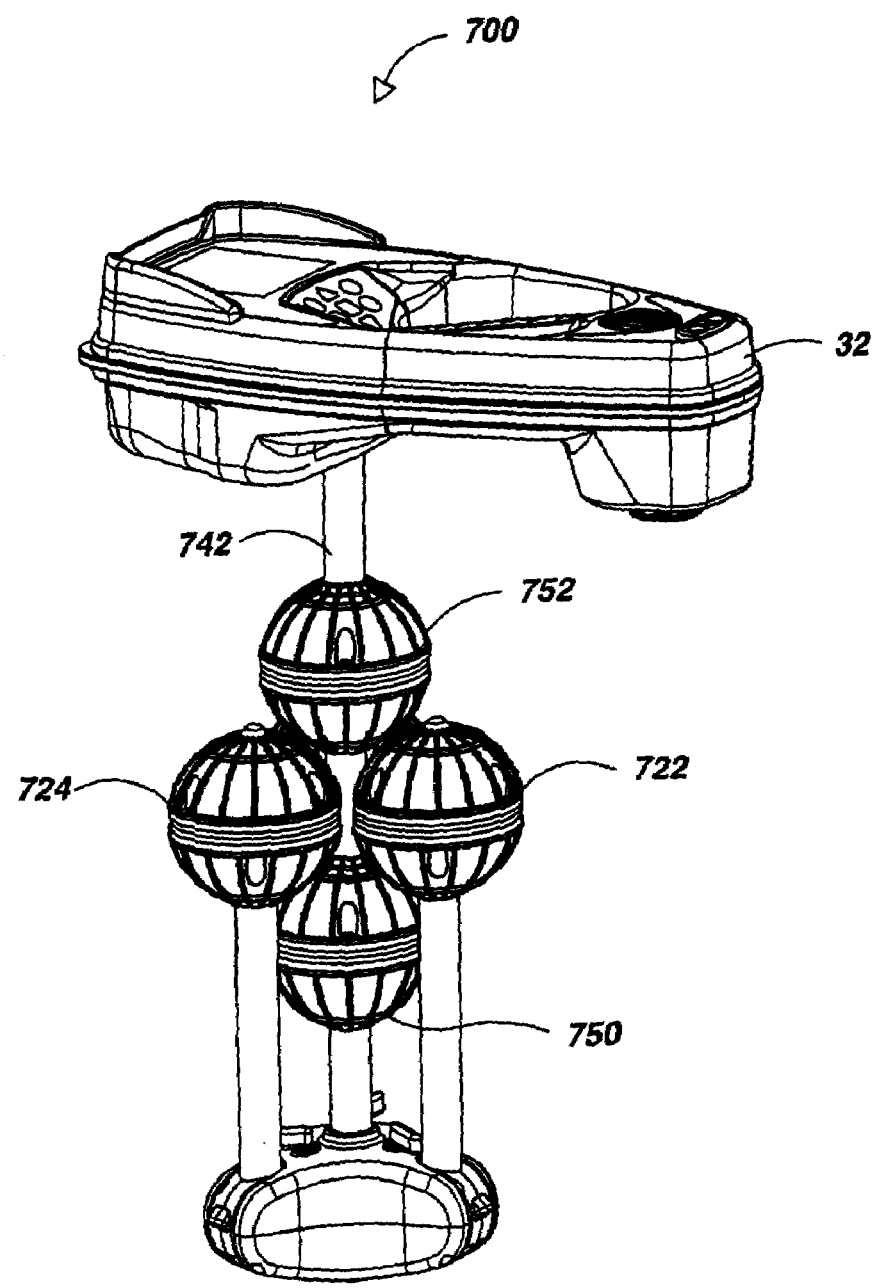
FIG. 14 is a view of the tripod locator of FIG. 13 in a folded state.

FIGS. 13 and 14 illustrate an alternate configuration of the tripod locator 700 in which the nodes 720, 722 and 724 are pivotally connected via shorter legs 730, 732 and 734 to a pivot assembly 740. The pivot assembly 740 is connected to the lower end of a central leg or support 742 that carries two additional vertically spaced nodes 750 and 752. The upper end of the central support 742 is connected to the housing 32. The unfolded and folded states of the tripod locator 700 are illustrated in FIGS. 13 and 14, respectively.

Figure 15:
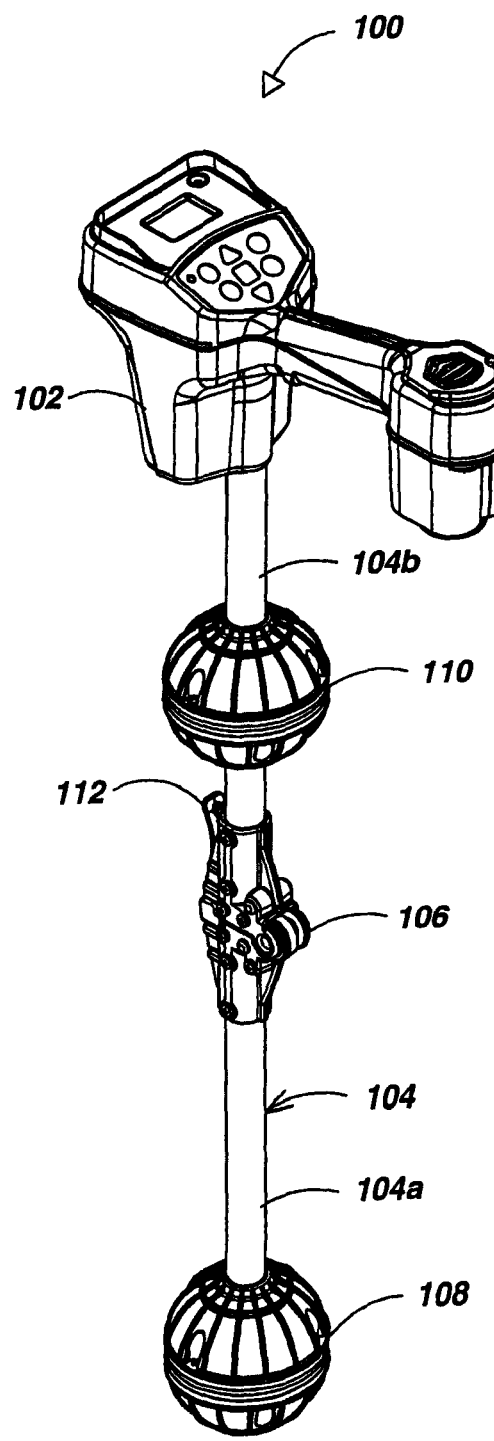
FIG. 15 illustrates a locator with two nodes in its extended configuration.
Figure 16:
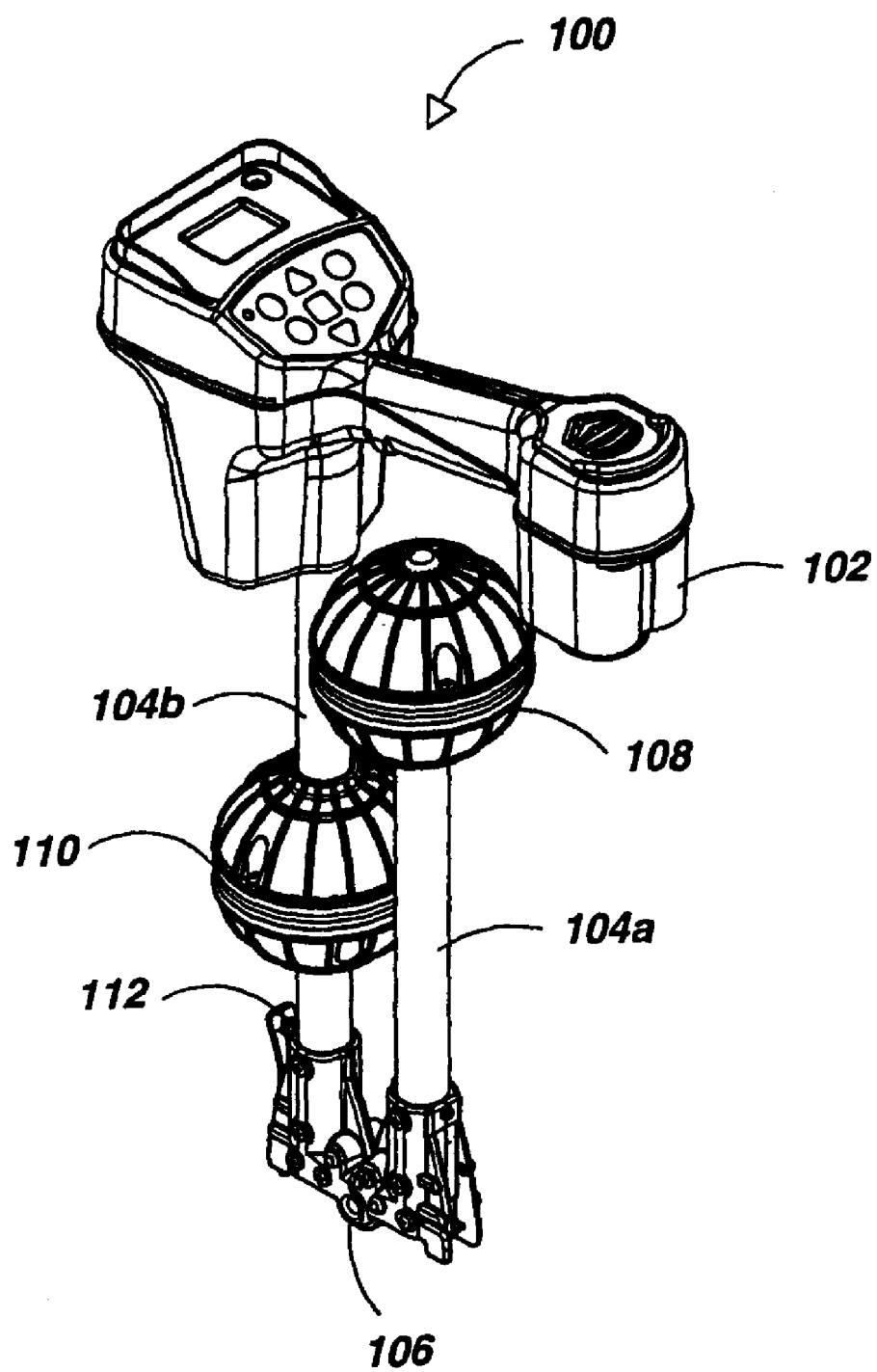
FIG. 16 illustrates the locator of FIG. 14 in its collapsed configuration.

FIG. 15 illustrates a locator 100 with a housing 102 that contains most of the electronics and the upper end of elongate support 104 is connected to the housing 102. The elongate support 104 has a lower segment 104a and an upper segment 104b which are pivotably connected by a hinge assembly 106. A first sensor node 108 is connected to the lower end of the segment 104a. A second sensor node 110 is mounted intermediate the length of the upper segment 104b. FIG. 15 illustrates the extended configuration of the locator 100. FIG. 16 illustrates the collapsed configuration of the locator 100 in which the lower segment 104a and the lower sensor node 108 have been swung upwardly. A clasp 112 on the hinge assembly 106 is used to lock and unlock the same.

Figure 17:
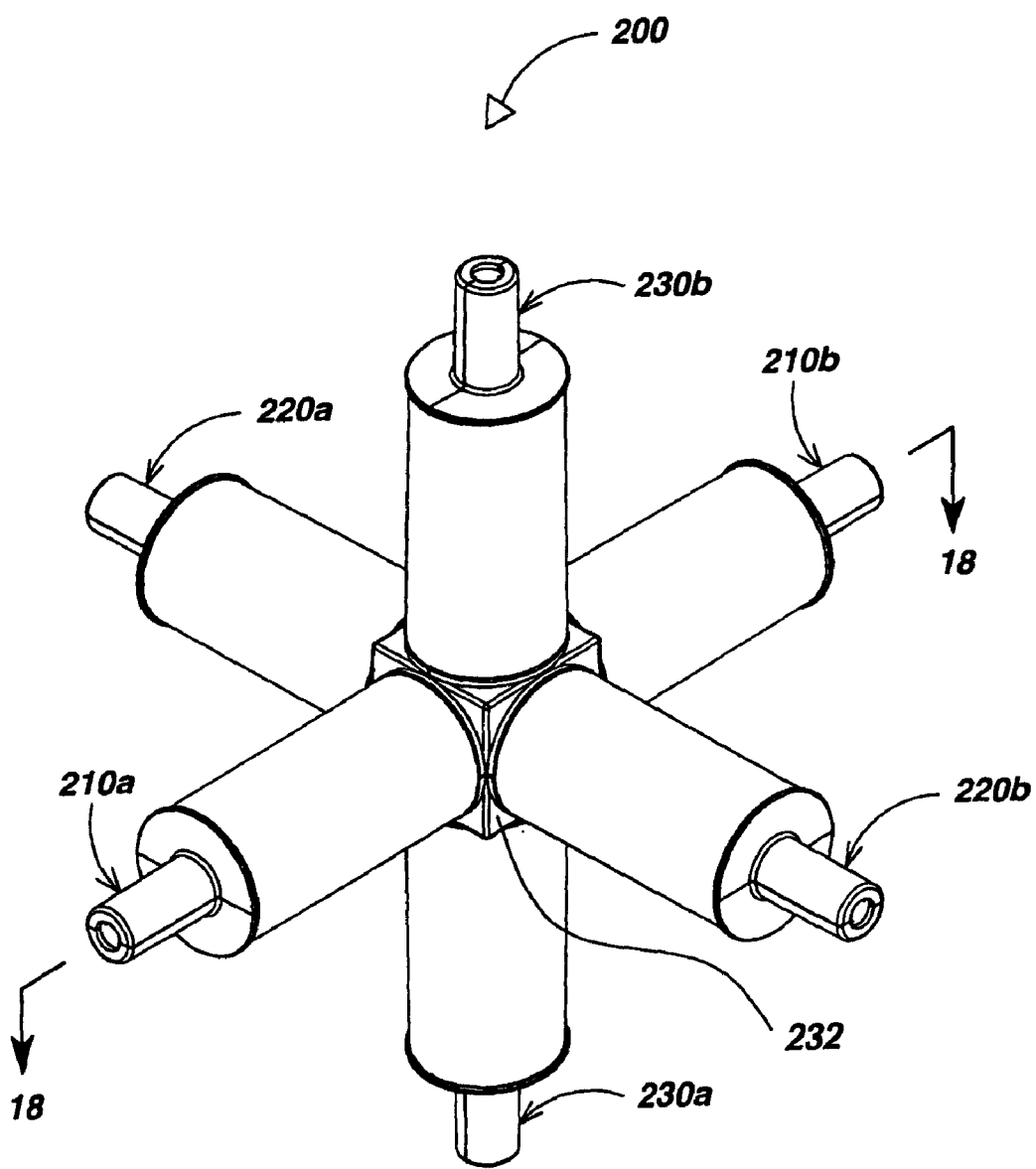
FIG. 17 is a perspective view of an orthogonal sonde array.
Figure 18:
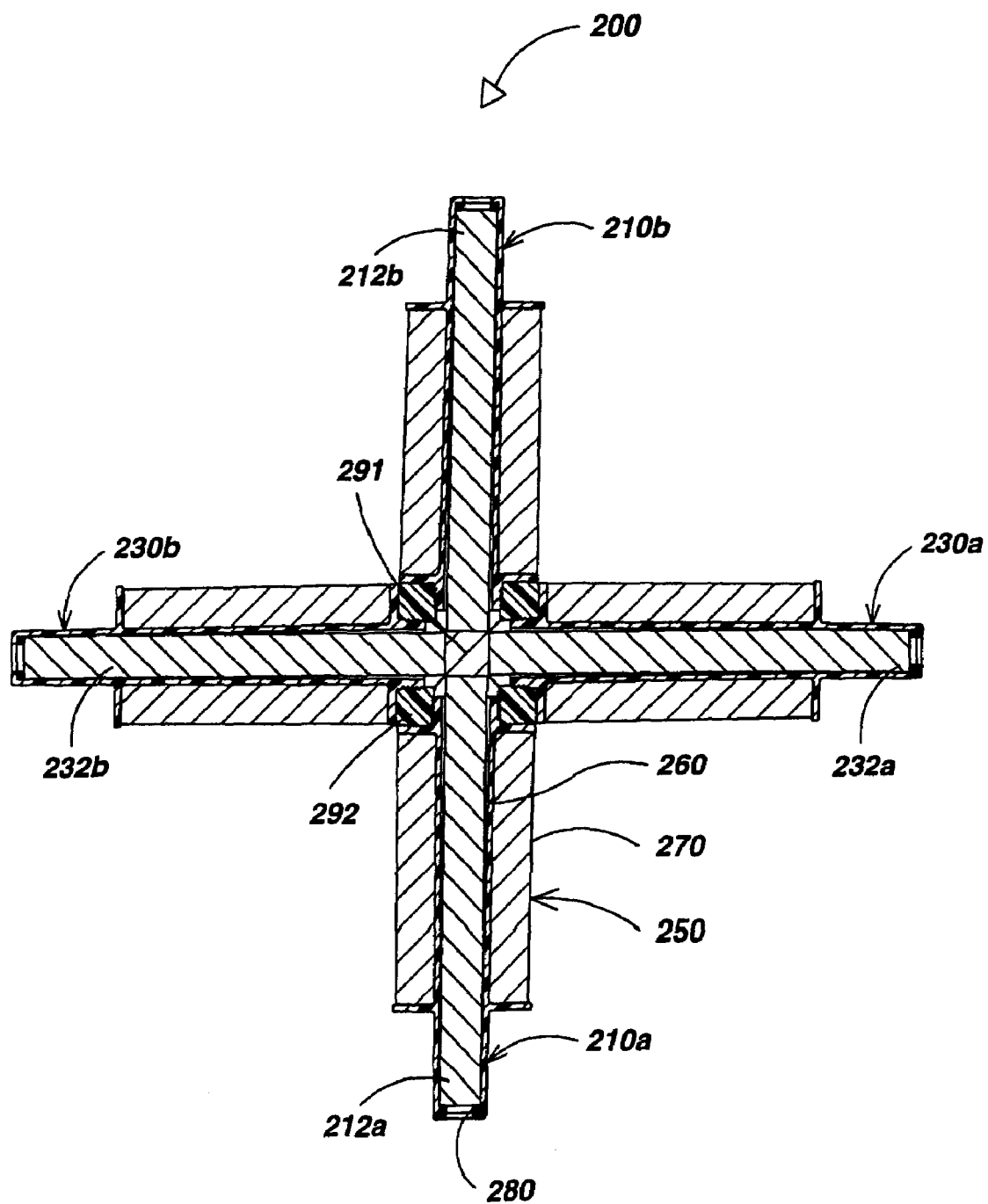
FIG. 18 is a sectional view through FIG. 17 showing the construction of the array.

FIG. 17 illustrates an array 200 of three orthogonal sonde pairs, each having coil wound around ferrite cores. Six molded core forms 210a, 210b, 220a, 220b, 230a and 230b comprising the sondes are visible in FIG. 18. Each of the six sondes has an identical configuration. By way of example, a sonde 250 (FIG. 18) comprises a central ferrite core 212a that extends within a surrounding cylindrical plastic bobbin 260. Three other ferrite cores 212b, 232a and 232b are also visible in FIG. 18. A copper wire coil 270 is would around the bobbin 260. The ferrite core 212a has one end pushed against a rubber O-ring spacer 280 within the bobbin 260. The sondes of the array 200 are arranged and connected in three separate sets, each set being wired in-phase, in series electrically they appear as one coil. A center block 291 of magnetic material 231 couples each pair of cores together to make them magnetically longer. A central hub 292 encloses the block 291 and each of the bobbins such as 260 screws into the same. A portable hand-held locator can be constructed that utilizes the sonde array 200. A square wave is used to drive a tank circuit. A single power amplifier running at a single frequency switches from coil-to-coil at substantially the zero current crossing points. All of the coils are preferably identical. All the sonde pairs are orthogonal to each other at an equal angle to a vertical support (not illustrated) to reduce receiver coil nulling. The drive frequency of all the coils is preferably identical. Comparatively, the drive frequency can vary from coil-to-coil by an integer number of cycles. The drive period may vary from coil-to-coil by an integer number of cycles, such as 23, 24 and 25 cycles for the three orthogonal coils. The locator can have other sensors, including a tilt sensor, a compass, GPS, etc., to reduce degrees of freedom to enable the requirement that the absolute signal strength of the navigation sondes be known, but not required. It is possible to suspend the processing of each channel when a signal from that coil is not broadcast.

One aspect of our mapping locator includes an improved navigational sonde beacon. This beacon operates off a single constant frequency signal source in an open loop fashion that does not require communication between the signal source and the transmit coil array. Our improved beacon uses a single tanking capacitor bank to increase transmitted magnetic moment. After some predetermined number of signal cycles, this single tanking capacitor bank is switched at or near the zero crossing of current to the next transmit coil in a predetermined switching frequency.

A highly advantageous aspect of this invention allows a standard line locating transmitter to act as the signal source for our improved navigational beacon. This is possible since this beacon operates at a continuous output, single fixed frequency, and hence, does not require any communication between the signal power source and the transmit coil array.

Greater output power and range at constant input power can be achieved by using larger coils with larger, lower resistance wire. This allows larger beacons to be used with the same signal power source if greater operating ranges are needed. An example of one embodiment of our navigational beacon is shown in FIG. 17. This embodiment uses ferrite cores to achieve a compact portable structure, but air coils could also be used.

Our mapping locating receiver uses the signal from the navigational beacon and needs to be able to determine which interval in time corresponds to the transmission of signal from a particular coil in the transmit coil array. One advantageous method of providing a timing index is to simply turn off the transmission of all of the coils in the array for some brief period of time. While the tanking capacitor can store the energy in the tank during an off period, this has the undesirable effect of unloading the signal source, thus making it more difficult to maintain precise output regulation when the load is switched back on. It is important to the effective operation of the navigation system that the output of the X, Y and Z coils are as equal and uniform in time as is reasonably possible, thereby improving the accuracy of navigation. One embodiment of our invention solves this problem by adding a fourth shielded inductor having approximately the same electrical characteristics as the three orthogonal transmit coils. During the off period, the magnetic energy in the oscillating tank is stored in a non-transmitting inductor. A toroidal inductor would be one suitable choice as the majority of the field will remain trapped in the core and not externally radiated. It is only important that enough of the field not be radiated so that the timing signal is clearly discernable by the receiver.

A mechanical or electrical switch allows adjustment of the total capacitance in the tanking capacitor bank. Such an adjustment serves to tune the tank to a different navigational beacon channel, allowing two or more beacons to be used at the same time in the same area. Switching the tank to a significantly higher frequency allows this transmit array to also be used as an omnidirectional inducing array when searching for unknown buried utilities.

In another embodiment of our navigational beacon, the tanking capacitor can be switched out of circuit (bypassed) allowing a multi-frequency or repeating composite waveform to be transmitted. This would typically be employed in combination with air coils Referring to FIG. 19, one embodiment of our navigation sonde beacon 300 is illustrated and is connected to a line transmitter signal source or transmitter 302. The line transmitter 300 outputs an amplified square wave power signal in the approximate range of 10 Hz to 10 kHz for navigation purposes. Higher frequencies can be used if induction is desired or not of any concern. An optional edge detector 304 senses the exact timing of the wave form transitions. A cycle counter 306 is used to determine coil-to-coil switch timing and can be placed at other locations within the circuit. A small transformer 308 can be placed in the circuit to extract power from the signal to power the beacon, or alternatively, a battery 309 can be used. A tanking capacitor bank 310 is used in the circuit. The capacitor bank 310 can be bypassed with a switch 311 or removed, if untanked operation is desirable. The capacitor bank 310 can include switchable capacitive elements to permit the tank circuit natural frequencies to be tuned to alternate frequencies either by the operator via channel selector 312 or under the control of a control block (C) 314. For the purposes of sensing and control, the voltage across the tanking capacitor bank can be measured by a voltage sensing component 316.

Figure 19:
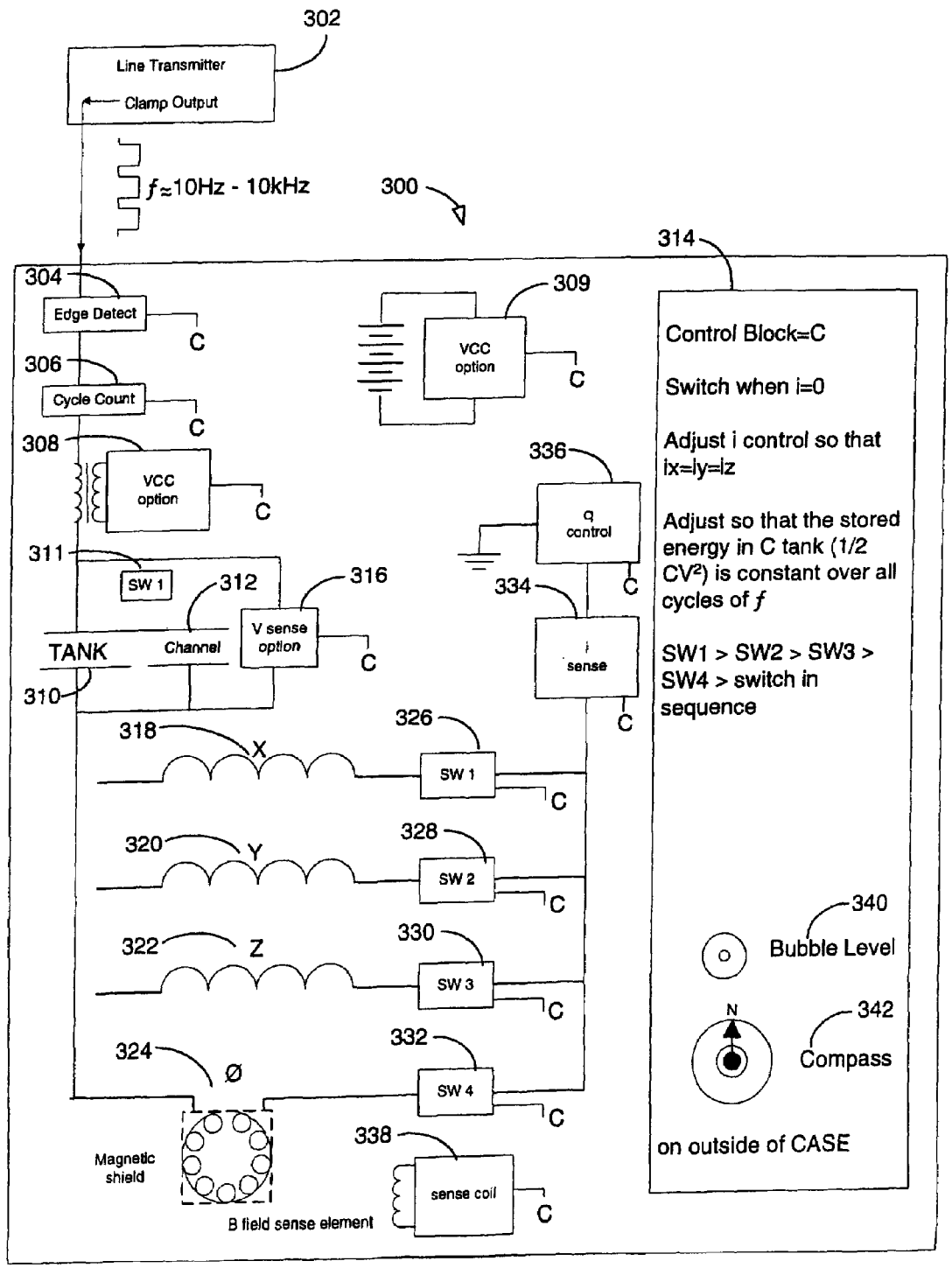
FIG. 19 is a block diagram of a navigational sonde beacon.

In the example illustrated in FIG. 19, one end of each of the X, Y, Z transmit coils, 318, 320, 322 as well as an optional non-transmitting, null coil 322, are tied in common to one end of the capacitor bank 310. The voltage at this point can swing to high levels, and it is desirable to place switching elements 326, 328, 330 and 332 at the other ends of the coils. Current can optionally be sensed between the capacitor bank 310 and the coils. The null coil 324 is preferably a toroid. Since it is desired to switch at the point of zero current where all of the tank energy is stored in the capacitor and none in the active inductor (coil), a triac is one suitable switching element. If all of the coils are electrically matched, current sensing and current control is not required. However, greater control of the output can be achieved if a current sensing element 334 is used. A Hall effect current sensor can be employed to measure current. A control circuit 336 can optionally be employed to improve the coil-to-coil transmitted power matching based upon feedback from current and voltage sensing elements, or optionally, from a B field sensing element 338 (coil, GMR or similar), or both. A sensing element can be placed on each inductor/coil, or a single sensor can be employed if its response to each coil can be characterized and known.

The control block 314 is used to control the switch timing. The control block 314 is designed to switch one coil out of and the next coil into the tank circuit 310 when the current flowing through the active inductor is near or at zero. Where the control circuit 336 is employed, the control block 314 substantially equalizes the current or the radiated measured B field from each coil.

The internal timing between coil-to-coil switching need not be uniform, but must be equal to an integral number of input drive signal half cycles. A preferred embodiment would have the transmit time of each of the X, Y, and Z coils be equal, but utilize a shorter period of off, non-transmitting time during which the null coil was switched in. The control system works to keep the maximum stored energy in the tanking capacitor bank constant from cycle to cycle.

The navigation sonde beacon housing would optionally include a level indicating device such as a bubble level 340 and an optional means for the user to level the case to true earth horizontal. Two fixed supporting points and one adjustable supporting point provide a simple means to allow the user to level the transmitting array to a known position relative to the earth's surface. Additionally, a magnetic compass 342 (electronic or mechanical) can be used to aid the user in optionally rotating the transmitting array into a known orientation to the local magnetic field. Such specific positioning is not needed for relative navigation but can be helpful if it is desirable to relate the data collected during navigation to a world coordinate system.

On the receiver side, an additional active calibration or signal reference coil can be incorporated into the antenna node, or into the body of the locator itself, to provide a self calibration capability. This calibration coil can be used to calibrate the relative sensitivity of each coil within the node. The active signal from this coil can also be used to allow the processor to determine the relative positions of individual antenna nodes with respect to each other and the coordinate system of the instrument. In one embodiment of our invention, this calibration coil is integrated into the interconnecting element aligned approximately with the mating plane of the two hemispheres. Another embodiment of our invention uses mix ferrite, Permalloy, GMR, GMI, and air coils within a node. Another embodiment distributes air coils along the arms. Another distributes ferrite, Permalloy, GMR, GMI, and air coil sensors along the arms to achieve minimum interaction between the nodes, while still another embodiment locates conductive spikes in the leg tips to do the magneto telluric inverse at the same time. Another embodiment has isolated nodes and tripods that communicate on a local area networks such as 802.11 or Blue tooth and use central processing means and/or distributed processing means.

Our multi-sensor mapping locator can be used to track a sonde associated with a pipe inspection camera. The locator is placed in a fixed position within signal range of the sonde, and the sonde is moved and tracked, mapping the track of the pipe in three dimensions. Importantly, the pitch or slope of the pipe may be accurately measured without the need to place a pitch sensor in the sonde or camera.

Our mapping locator can be successively moved in leap frog fashion, along the path of the pipe being mapped to create a connected map larger than the transmitting range of the sonde. Unlike prior art, only a single locator is required to accurately map the path of the sonde.

One or more navigational beacons can be placed to allow mapping within a work area. One or more GPS receivers can be incorporated into our navigational beacons to allow mapping information to be related to one or more coordinate systems, one example being latitude, longitude. A GPS receiver can also be incorporated into our mapping locator. If two or more GPS receivers are part of the locating system, then DGPS techniques can be employed to further improve mapping accuracy.

Radio links between the locator and our navigational beacons can be incorporated into one or more of the navigational beacons in use within a work area. Radio links between the mapping locator and any number of navigational beacons may form part of a wireless network.

Mapping data may be stored within any system component that is part of the locating system. A preferred approach is to store mapping data within the portable mapping locator. However, in certain implementations, the mapping locator can act as a data transceiver and send either raw magnetic sensor data or further processed data onward via wireless techniques to a data logging, or display, or control component, of the locating system, for example a portable computer optionally configured to receive, store, display or further process said data. Stored mapping information can then be used to update a geographic information system (GIS). An over determined navigational system that can use Kalman filtering techniques to improve accuracy is also disclosed.

Our mapping locator can be placed on the ground directly over one of the navigational beacons as part of a calibration process. In a non-contact, non-aligned manner, the locator can more accurately determine the tilt and orientation of the beacon using its own orientation sensors. Additional information can be exchanged between the locator and the beacon during this process taking advantage of the known close proximity (IR optical communication for example). The locator can measure the signal strength of this beacon very accurately, during this operation.

Acoustic sensors can be placed in association with the navigational beacons and means is provided via a radio or other data link to transmit this data back to the mapping locator. This listening can be used to detect leaks in piping systems. Leaks in building foundation slabs, so called slab leaks could readily be pinpointed using known correlational techniques. The advantage of this system over known systems is its mapping capability. In another related embodiment, the mapping locator is provided with a sound source to inject acoustic energy into the ground at a known location. Tomographic imaging techniques can thereby be utilized to develop acoustic images of subsurface structures. The locations of the sound sources are known relative to the receivers. A ground penetrating radar (GPR) device can be incorporated into our navigated mapping locator, SAR or tomography techniques can be employed.

Additional navigation sensors can be integrated into our mapping locator. The addition of sensors allows navigation in the absence of navigation beacons or it can improve mapping accuracy by providing an over determined system or allow mapping excursions beyond the range of the navigational beacons. Navigation beacons can be incorporated into transmitting devices designed to put tracing signals onto buried utilities. The frequency of the beacon built into the line transmitter varies according to which utility channel had been selected by the operator for tracing. A plurality of distinct utility channels can be used to facilitate utility identification during mapping.

Our multi-sensor mapping locator can be used to track a sonde optionally associated with a pipe inspection camera. The locator is placed in a fixed position in signal range of the sonde and the sonde is moved and the track of the pipe is mapped in three dimension. Importantly, the pitch or slope of the pipe may be accurately measured without the need to place a pitch sensor in the sonde or camera. In order to allow accurate slope measurements to be made, the user can manually level the locator using a bubble level or other leveling device. Alternatively, a two or three axis tilt sensor can be incorporated into the locator to allow true slope measurements to be made without the need for leveling the mapping locator. Any other signals due to cables and pipes in this same area can also be simultaneously mapped by the methods described. In a further improvement, the mapping locator alerts the operator with a signal to indicate whenever the sonde being tracked moves into or out of tracking range. Such an alert signal can be done, using any means available, such as sound or light or vibration, discernable by the system operator. Such means might use a remote signal divide in near proximity to the operator. The remote signal device might use a radio link between the mapping locator and the remote signaling device. The equations needed to make such positional calculations are known. See for example, U.S. Pat. Nos. 4,054,881; 4,314,251; and 4,710,708, the entire disclosures of which are hereby incorporated by reference.

Our mapping locator can be successively moved along the path of the pipe being mapped to create a connected map larger than the transmitting range of the sonde. In this method, before the sonde moves out of the detection range of the mapping locator, the movement of the sonde is stopped and the mapping locator is moved to a new fixed position allowing further movement of the sonde within the detection range of the mapping locator. The piping system is thereby mapped in segments, and each segment is mapped with the locator in a fixed position. Successive, connected segments are mapped from successive locator positions. In this method of operation, the locator can optionally signal the operator when the mapping locator needed to be moved to a new forward position (or rearward depending on the direction of sonde movement), to allow the mapping locator to remain within mapping detection range.

In the absence of additional navigational sensors, the sonde remains fixed and is not moved, while the mapping locator is being repositioned to a new forward location. In this basic method, using no other navigational sensors, certain positional and orientation ambiguities can arise. If the axis of sonde being tracked is nearly vertical, then it becomes difficult for the mapping locator to accurately resolve its orientation with respect to the horizontal orientation of the pipe track. During locator repositioning, if the sonde axis is not near vertical, the locator can use the signal from the sonde, as a navigational beacon, to track its own position relative to the coordinate system of the piping system being mapped. During this process the mapping locator can guide the operator repositioning the instrument to a desired new location based upon a predicted direction of sonde travel. During this process the locator can guide the operator in such a manner to stay within detection range and avoiding positions that might result in positional or orientational uncertainties of the mapping locator with respect to the sonde. The addition of a compass allows the mapping locator to determine its own orientation with respect to the world coordinate system. In the simplest configuration, a mechanical compass might be employed and the operator instructed to always place the orientation of the locator in specific orientation with respect to the compass needle after each successive repositioning movement. A further improvement is to provide a means for the mapping locator to measure its own orientation with respect to the local fixed magnetic field (typically that of the search), for example, incorporating an electronic compass into the instrument. If the orientation of the field sensed by the compass is constant at each position, the mapping locator is moved to, then each mapped segment will have a correct orientation to the previously mapped segment. Using a single axis sonde, an unambiguous determination of the relative position of the sonde and the four-antenna node, mapping locator, can be obtained if the orientation (yaw, pitch, roll) of the locator is known relative to the earth coordinate system. A compass and a multi-axis tilt meter is needed in the locator to resolve uncertainties with respect to sonde signal strength, ground slope, sonde orientation or any need to remain with detection range of the sonde during locator repositioning.

In another embodiment, one or more navigational beacons are placed to allow mapping of unknown underground objects, within a work area. In a preferred embodiment, these beacons are low frequency (approximately 1 Hz-10,000 Hz), single or multiple axis, dipole transmitters. Lower frequencies tend to not inductively couple onto other objects within the mapping work area. In choosing frequencies, a balance must be struck between minimal coupling and high levels of ambient low frequency noise or jammers found in many environments. A simple mapping configuration utilizes a single axis dipole transmitter in combination with our mapping locator. The mapping locator is configured with a two-axis tilt sensor and an orientation sensor such as an electronic compass. So long as the mapping locator is not inverted, a three-axis tilt sensor is not required. The tetrahedral, four position, 3-axis antenna node embodiment, of our mapping locator does not require that these single axis beacons be placed in any particular orientation. For some applications, relative navigation within the work area is all that is needed, while other applications require navigation relative to a world coordinate system. If more than one beacon was employed simultaneously, then known means are employed to make the signals distinguishable. Frequency coding, for example, is one simple means wherein each beacon transmits a signal at a specific predetermined Frequency. A known coding scheme can be employed to make the signal from each beacon separately distinguishable. Two and three axis beacons allow locator configurations with fewer numbers of antennas or allow a more over determined system and greater potential locate accuracy, especially in noisy environments. A single axis dipole transmitter can be rotated at a highly constant rate in various known techniques. The flux angles and phase reversals of the transmitted signal can be used to accurately determine an angular orientation measured around the transmitter's axis of rotation.

In one embodiment a crystal controlled servo or stepper motor can rotate a horizontally disposed, dipole transmitter around a vertical axis at a highly constant rate known to the mapping locator. The rotational rate (frequency) must be small relative to the transmit frequency.

In areas where an accurate compass bearing cannot be measured, the foregoing technique provides information to allow a relative bearing between the beacon and the mapping locator to be established. A practical way to make a low frequency magnetic dipole beacon is to spin a permanent magnet around an axis approximately normal to the North-South pole axis of the magnet by known means, such as using a battery powered electric motor. Using vertically oriented beacons placed on a horizontal surface, measuring at constant height, field strength is a function of range only. The spread apart sensing arrangement of the preferred embodiment of our mapping locator can utilize the $1/R^3$ property of the vertically oriented dipole field to determine the range and relative bearing of the beacon from the mapping locator. However, unless the orientation of the locator is known in world coordinates, using a single axis vertical beacon, the locator can lie anywhere on a circle centered on the beacon. As stated elsewhere this ambiguity can be resolved by using a compass to establish the absolute orientation of the locator. The limitation can also be resolved by using two or more beacons without requiring the use of a compass. Unless the operator is highly skilled at holding the mapping locator in an accurate vertical orientation, a two axis tilt sensor is highly desirable in the locator to allow the locator to constantly correct for changes in tilt from vertical. Standard known techniques for transforming one coordinate system in to another are known and can be employed to make these corrections.

All discussions herein about navigating our mapping locator with respect to one or more beacons assume that the beacons are within a range where adequate signal levels are available to allow navigation to some level of desired accuracy. Two beacons can be used to create a simple navigational net or array. A line that runs from one beacon to the other defines a navigational baseline. So long as the mapping locator remains on one side of this baseline, unambiguous navigation can be achieved without requiring an orientation sensor in the locator. Adding a third beacon in an approximately triangular configuration resolves the crossing of the baseline ambiguity, and provides an over determined system for greater locating accuracy. These beacon navigational techniques are similar to long baseline acoustic navigational methods used in navigating vehicles underwater, and many of the same lessons and techniques can be applied. For example, the positions of the beacons can be completely unknown to the locator when placed initially, and well-known, iterative error reducing techniques can be used to determine and refine the known positions of the beacons during the survey of the work site. For example, simply crossing a baseline between two beacons allows the distance between the two beacons to be accurately determined, as the sum of the measured distances to both beacons will go through a minimum.

There is no real limitation to the number of beacons that might be employed to survey and map an area. As a general strategy, it will be desirable to fix the beacons in place while the locator is moving and vice versa. During beacon repositioning it will be desirable to set the locator into a fixed position so that it can track the position of the beacon during the repositioning process. Beacons can be color coded or otherwise marked to distinguish these as being unique. Beacons can all be identical and incorporate a switching means to allow specific transmission channels to be selected. Beacons of the same frequency can be employed in larger navigational array so long as they were not detectable by the mapping locator at the same time. One advantage of using a simple vertically oriented sonde is simplicity and cost. If the area being mapped is relatively flat and horizontal, relative signal strength alone measured with the sensing array of the mapping locator can be used to determine range and bearing of the beacon from the mapping locator without requiring computations of flux slope and dipole field models. A vertical sonde will also not induce a signal into a buried utility if it is placed directly above the utility.

In another embodiment, one or more GPS receivers are incorporated into our navigational beacons to allow mapping information to be related to one or more coordinate systems, one example being latitude, longitude. A GPS receiver can also be incorporated into our mapping locator. If two or more GPS receivers were part of the locating system, then DGPS techniques can be employed to further improve mapping accuracy. Incorporating GPS receivers into the navigational beacons is highly advantageous since they remain in a fixed location while the mapping locator is moved throughout the area being mapped. In one embodiment, GPS data can be transmitted to the mapping locator continuously by way of a radio or other means separate from the beacon signal itself. In another embodiment, the GPS data can be encoded onto the beacon signal itself by known means. Horizontal drilling sondes transmit pitch, roll and temperature and other data by various means.

In another embodiment, time stamped GPS data is stored in the beacon assembly for later transmission or downloading by wireless means or removable media. This technique is highly advantageous in that simple short-range transmission techniques might be utilized to communicate this data at the end of the mapping session just prior to recovering the beacon. A simple low cost, low powered IR or radio link might be employed between the mapping locator and the beacon to exchange this information. If a GPS receiver is also incorporated into the mapping locator the data can be time stamped and stored. This method allows for after-the-fact DGPS processing of the position of the locator and the beacons. A hybrid navigating system can be configured using the described beacons where navigating the mapping locator from a GPS available area, into areas where GPS is not available. GPS reception can be available for some beacons in the navigational array. For example, they can be positioned outdoors in areas of good satellite sky visibility, but not available to others placed indoors inside a building.

In another embodiment, radio links between the locator and our navigational beacons are incorporated into one or more of the navigational beacons in use within a work area. Radio links between the mapping locator and any number of navigational beacons can form part of a wireless network. Further, any beacon or locator which does receive GPS could re-transmit time code data to allow for simultaneous time stamp of other devices in the network which are not receiving, GPS signals.

We have invented a method of measuring the movement of the antennas of a locator relative to the field(s) and using this information to map the field in space. Preferred embodiments utilize acoustic Doppler, radar Doppler, optical (flow) navigation (both imaging and non-imaging), inertial navigation, E-Compass, tilt sensors, GPS, DGPS, sonde navigation, short baseline, and Kalman filtering techniques. Our new locator has the ability to store and spatially determine positions relative to the coordinate system of the locator as well as to the geographic coordinate system. Rolling or mechanical tilt (drag) sensors can also be used for determining motion relative to the ground.

Acoustic measuring techniques can utilize one or more beams. At least one means for determining the field flux vector is desirable. Kalman filtering can be used in this application in a GPR context.

Our locator takes advantage of a new antenna geometry that utilizes three axis orthogonal sensor (GMR and similar) pairs approximately symmetric around a common center point. Coil pairs can be summed or subtracted. Subtraction allows a field gradient along the coil pair axis to be established. This geometry allows a common center point, yet allows all of the coils to be identical and so to have a common electrical response. This is important for operation at a wide range of frequencies.

The coils can be placed on the faces of a cube. Three of the faces can have low frequency response and three of the faces can have high frequency response. The leakage inductance between the faces is what decouples high frequency and low frequency coils. There is no requirement for orthogonality because of improved processing capabilities. The balance point for fields aligned with an intermediate axis is useful for calibration.

In one embodiment, the first signal processing means is located INSIDE the space bounded by the antenna sensors. In another embodiment, calibration coefficients are stored within the space bounded by the antenna sensors. Within the housing a set of three or more sensors can be used. In another embodiment, acoustic or optical navigational transducers are mounted approximately at the intersection of one or more sensor axes and the outer surface of the receiving antenna enclosure. In still another embodiment, the first signal processing means is mounted in a plane perpendicular to an axis intersecting the approximate center of said antenna sensor arrangement where said axis has an equal angle relationship to the three mutually orthogonal sensor axes. A supporting structure, typically a hollow tube, can transect the antenna arrangement or it might terminate and affix to the supporting enclosure. The sensor array can also incorporate additional sensors such as a compass or a two or three axis accelerometer. Another embodiment has the sensor array incorporating an internal calibration coil. If the geometry is solid, the best calibration scheme involves placing a single turn on each receiving coil and calibrating the channel gain. The single turn is very controllable and very broadband when in series with a large resistor. If the channel gains are solid but the geometry is sloppy, the best calibration scheme involves a set of two or more coils to make known fields. A combination of these two calibration schemes can be utilized. A combination with calibration coils halfway between can also provide useful results. The more independent measurements that are available, the better the calibration.

The calibration signal can be shifted in frequency or amplitude from the target signal. Linear interpolation can be used between discrete calibration frequencies. The calibration signal can be PRN or true random white noise so that calibration can be obtained at the exact operating frequency by cross spectral density techniques.

In another embodiment the sensor array incorporates an internal calibration coil in the plane of the first signal processing means as described above or in another plane orthogonal to said plane. Still another embodiment has the sensor array incorporating an internal calibration coil which can transmit a calibration signal. The calibration signal might be intermittently or contiguously transmitted during locator operation. The calibration signal might be slightly offset from the target mix down frequency. The calibration signal might vary in intensity as some function of received signal strength. In another embodiment the field sensors can be flat planar coils of wire. In another embodiment the field sensors would be flat planar coils of wire consisting of separate inner and out coils with substantially different resonate frequencies allowing a greater range of signal frequencies to be accurately sensed. In another embodiment the field sensors can be wound on cores and affixed on each sensor axis. Processing means can be provided within the enclosed volume to convert sensor signals into a digital form for transmission outside of said enclosed volume. This allows analog transmission schemes.

Because the first signal processing means is approximately centered inside of said sensor array, certain interfering signals can be known and thereby subtracted or otherwise filtered from the desired target signals received. Digital noise cancellation techniques can be utilized. It is possible to measure the currents from the power supply and/or use very small loop antennas very close to processing means.

The sensors can be connectorized and not hard wired. Cable and connector connection from remote pods back to a central processing means can be advantageous. Cable and connector connection between distributed processing means can also be advantageous. In another embodiment, an active transmitting field generator is incorporated (marker balls and/or metal detection).

Multipoint techniques can be utilized whereby the sensors can be arbitrarily placed in space and need not be clustered in groups nor mutually orthogonal. Our tripod locator places a multi-point array of sensors in space. It is compact and foldable. It is also self-standing for fixed deployment. A folding baby crib (rectangular parallelepiped) with sensors distributed along the edge can outperform the tripod. The tripod gives very good lateral location but directional drilling needs very good vertical location. The drill needs to go over or under a horizontally extended target somewhere. Our locator needs to have substantial vertical extent. A four-legged tripod with a mast upwards will outperform currently available commercial locators. Taking noise into account, an inverted tripod array can perform better. It places more sensors where the noise is greater for more averaging. The sensors in our locator can be cable connected or wireless connected. Ethernet, Bluetooth, std RF, IR, GPS can be utilized in each node. A navigation system can be used to place these and spatially relate the remote sensors to an earth-based coordinate stem.

Our tripod locator geometry does not require a precisely known geometry. It is possible to drive the remote node coils active (sort of transponders) to allow the "net" to self-calibrate the positions of all of the nodes with respect to each other. One method is to cycle coil-to-coil in a fixed sequence and apply the techniques as taught by U.S. Pat. No. 4,314,251 of Raab (incorporated herein by reference) to locate each node with respect to its neighbors. A two axis accelerometer can be mounted in each node for precisely measuring tilt. Means are provided to transmit other sensor data from each node. Our invention can utilize a probe insertable into the ground such as a waterjet. A vacuum excavator nozzle with sense coils can also be constructed.

An anti-collision system for utility avoidance can be provided by first lighting up buried lines, then sensing bore head sonde-induced fields in these lines (HF, line illuminator added feature), thus providing a warning system upon close approach of a drilling sonde. The same techniques can be used for pot holing and digging. Super low frequency signals such as spinning magnets on the drill string can be used for tracking. Passive sonde techniques include GMR, GMI sensors and e-Compass technology. Direct calculation methods or direct positional solution methods can be used. The prior art has relied on special characteristics of the dipole field, i.e., the so-called locator point, to determine the boring had position and orientation. Our technique allows a closed form solution on the position of the drilling head relative to the locator and by inference with respect to an target boring path. Continuous, real time monitoring and control of the boring process is possible. A single LONG sonde allows tilt to be measured directly by the system. A leapfrog drilling technique is also possible. Raw node data can be transmitted at a low rate to a control system located where the drilling operator is located. Each remote node can have full process means using dipole technology and some or all nodes calculate and display an RMS or Maximum Likelihood solution as well. Calculation can be based on the field shape of the drill string not being a dipole. Automated current inspection of drill sections can be part of a drill string rack. Computer-assisted placement of nodes is possible. A computer can be provided with a utility map. The computer can calculate where a sensor needs to go to reduce ambiguity. It is also possible to locate a tilted sonde in the tip. It is possible to tell if a rotating tilted sonde is approaching a utility on axis of rotation or not by monitoring the current in the utility with a current probe. If you also have rotation angle you can tell if the drill is approached above or below. An inverse solution calculates the inclination of the axis of rotation directly. A voting scheme can be used. A Kalman filter that uses both the tilt sensor and the inverse solution is possible. A tilted sonde can be placed in the drill since it is essential NOT to hit the utility. In the case of vacuum pot holing it is essential TO HIT the utility, so having the display on the side of the nozzle is advantageous. The worker wrestling the nozzle has the display in front of him. Placing four sondes in a nozzle allow you to get range and bearing. A tall pole version of our locator can be designed for directional drilling and have a jack for a nearby accessory antenna.

An improved mapping locator can utilize an array of flux antennas using multi-point field sampling in said locator to determine the location of objects of interest. Advances in numerical computing power allow the cost effective use of larger numbers of antenna coils than prior art cable locators.

A preferred embodiment of this locator utilizes a single vertical antenna mast with a lower and an upper antenna as well as two additional antennas preferably on hinged supports that can be positioned to form a tetrahedron with sides of approximately equal length. In this preferred embodiment, each antenna contains three or more mutually orthogonal coils. Optionally each coil can be split into a coil pair sharing an axis of symmetry.

Using multi-point field sampling, it is possible to determine the distance and direction to an extended line source, such as a cable or pipe, using the ideal signal spreading relationship 1/R. Similarly, the distance and depth to a compact dipole transmitter can be determined.

This technique has the advantage over currently available locators, of being able to directly locate the range and bearing of dipole transmitters placed beneath a reference surface, such as the ground, without the need to determine the location of a special place in the field where the field lines are either vertical or horizontal. The depth of the dipole transmitter below the reference surface can also be determined.

We will call the point on the ground directly above a subsurface dipole transmitter a "Sonde Locate Point." In the case of the antenna array in the preferred embodiment noted above, this sonde locate point will occur very near the centroid of the three point base of this tetrahedron array. This dipole locating method has the advantage of allowing the operator to traverse nearly directly to Sonde Locator Point without first locating points in the horizontal plane where the magnetic flux vector is vertical. A search pattern is not needed. The sonde Locate Point is indicated on the display in the direction of the highest field intensity, independent of the orientation of the magnetic field lines.

The accuracy of a dipole locate can be improved by assuming a dipole model of the source and correcting for the variation in dipole field strength with respect to the axis of the dipole. The sonde Locate Point is preferably displayed relative to the coordinate system of the locator and will move dynamically on the display proportional to the relative motion between the locator and this point. This antenna configuration allows the direct tilt of the dipole transmitter to be measured. A key advantage of this improved locator in terms of cable and pipe locating is that the depth can be rendered even when the locator is not directly above the line. Both field intensity as well as field gradient information can be used to calculate the displayed position of this cable. Many typical locates contain multiple pipes or cables at various depths and orientations.

Using both field gradients, as well as flux vectors at multiple locations provides an improved ability to display multiple utilities or distorted fields.

Utilities often cross at different depths, occur in the same trench in parallel and also at different depths and also intersect in Tee's. The broader sensor footprint allows for significantly improved display rendering of these complex situations. In one embodiment, the antenna coils are aligned with respect to the antenna supports. The antenna array need not be tetrahedral in shape, but can be any arbitrary shape provided the coil positions can be determined. Each antenna can be separately calibrated. Such calibration is facilitated from a manufacturing point of view if the calibration data is locally stored within this antenna housing. It is further advantageous, but by no means required if the magnetic flux signals sensed by the coils are converted to digital form within said antenna housing. The positions of the hinged arms could be determined by position sensors or simply by processing the field data to determine if the hinged supports were open in a spread position or closed in a more compact configuration.

While the numbers and types of the antenna supporting structure can be of almost any form, the three legged tripod structure shown in FIGS. 1-3 has the advantage of being stably deployable on uneven surfaces while allowing the operator to conveniently view the display screen. The foregoing techniques can be combined with other sensors including GPS, DGPS, tilt, accelerometers, compass, magnetometers, etc. The foregoing techniques can be combined with a marker excitation coil. This antenna array supports the capability to make depth measurements of makers. Individual antenna housings can be configured with more than three coils. A preferred embodiment of three pairs of coils allows the determination of field gradients between coil pairs. Dual trace, current direction, RF, tuning, dual channel mixers, optional mix down to DC, low sampling rates, many filters, the ability to fine auto-tune due to crystal drift and optional temperature compensation are useful techniques with our locator. A color display may also be useful.

Optical navigation represents a means to use gradient locating with a single antenna. A memory is advantageous for this function. Further, a means to enable a mapping function is possible. Mapping data can be stored in a solid state, hard disk or other memory, or similar media. Said media could be fixed or removable. For fixed media it is necessary to provide a means to download data, by wired or wireless or optical or other remote data transfer means.

If only gradient locating is being employed without mapping, then only the direction and rotation of the movement of the locator over the ground is needed for directional sensing. If accurate mapping is needed then a true velocity is needed and the height of the optical sensor above the reference surface, or ground, is needed. Optical mouse IC's can be used. Ultrasonic height reference, laser spot(s), pattern and acoustic Doppler navigation can be used.

For multiple locator configurations, it is possible to integrate a radio link to send data to a central point. A DC in jack is advantageous for this type of usage. A sonde can be added to each unit to allow each to locate its neighbor (directional drilling applications).

Our locator can have the ability to show a CURVED line (or band) on the display. Only an array of sensors can do this in a meaningful fashion (or else of course a navigated sensor). A line from each of the four antenna nodes can be indicated on a display. The field data from each antenna node can be transformed into the coordinate system of the instrument or the world (relative to each normal). A color or gray scale or patterning (dotted-dashed line upper ball) can be used to distinguish the lines. The locator assumes a cylindrical field for each, and calculates an apparent distance from each ball using the information from the other three to determine a relatively scaled offset for each line on the display. If the line was straight and the return current was uniform (no skin effects or return current effects, then all four lines would align on top of each other. Variations from the ideal case can be information rich.

The three lower antenna node lines can be used as boundary edges to create an area to display. The edges of this area can be smoothed using curve fitting, i.e., utilizing a three or four point spline) and then a gray scale contour can be used to display this are by various means. Narrow areas with approximately parallel opposite edges would be darker and more distinct, broad trapezoidal areas would be less dark and feather to indistinct edges.

The information from the lower triangular array can be used to derive and display a single line that may or may not be curved. A variant involves averaging the angular orientation of the three nodes to a predicted line orientation and using this to set the orientation of the line at its midpoint. Similarly, it is possible to calculate orientations for the line at the two ends where they would intersect the edges of the display (some offset distance from the apparent line midpoint). The midpoint of the line would be offset from the display center point (instrument origin) proportional to the slope of the field use this simple approach to draw an arc with some radius of curvature. A very large radius of curvature would be displayed as a straight line. This should have a similar effect to that just explained. The overlaid lines can be translocated into a gray scale pattern to indicate an approximate flux pattern. In the ideal, cylindrical field case, this would look very much like a line.

The locator can assume that the field is due to a single conductor with some radius of curvature. It can further make the simplifying assumption that this single conductor lies within a plane. Using the top ball the locator can get a conductor plane tilt. A best fit solution using field data from all of the coils can be used to calculate the position, orientation and radius of curvature of this conductor model. This curve solution can be displayed, projected onto the plane of the display. Curves can be displayed as ellipses if the plane of the conductor and the plane of the display are not parallel. The locator can determine how well the solution matches the model. If the match is perfect, the locator can display a sharp and distinct line. If the simple model solution matches the "single conductor arc" model poorly it can then display the "line" as the gray scale band following the path of the line. As the match degrades due to complex fields which do not match a single conductor model, the locator can make the gray scale line wider and lighter in color with less distinct edges.

The use of a color display allows the locator to encode depth, tilt etc. with color, for example, red for close, blue for far (Z depth, not range from the instrument). Gray scale display along the lines can be added.

It is possible to create a "laser light show" on the ground of where the utilities are. A pair of motorized mirror faces and a laser can be used to do this. Since you know the height from the ground, it is possible to project, using vector graphics to drive the laser, a simple indication of the pipes, cables and other objects located underground. Since this feature of the locator shoots "down" and would have a safety interlock so that it would not fire unless pointing down and level, the potential for eye damage is minimized. Also, preferably the locator has a trigger that must be squeezed or held to make the locator project images of the located utilities. Projecting these images on the ground is the most intuitive way of displaying the information. The need for a display on the locator itself could be eliminated. One or more vibrating pager motors could be mounted in the handle of the locator to indicate dimension of information.

Communications between a locator and transmitter could be handled through a "router" device. A laptop or PDA would be optional for this, since it could be a central orchestration point for all devices, and provides an easy access point for the data, massive storage, easy way to edit text and other site information, a standard way to include other media (digital pictures of site, etc.). This architecture also removes the burden of storage from the locator, and places it in the laptop-PDA, thus simplifying the architecture, etc. This makes it much easier to access and provide integration to GIS databases, Internet, etc. A PDA is something that one can carry around whereas a laptop could perhaps be left in the truck logging as you go. It may be desirable to provide a direct device to device communication for triangulation. Communications protocols such as Bluetooth and 802.11b (and others) are now available in relatively inexpensive modules, and built into many laptop/PDA devices as standard.

The number of sources and the number of unknown variables to be solved in an inverse problem must be provided to most algorithms. Utility maps provide a reasonable estimate of the number of unknowns to be solved. The number cannot be regarded as exact because there may be abandoned utilities in the survey area that predate available maps. The presence of abandoned utilities would lead to an underestimate of the numbers of unknowns. It is also possible that a known utility is severed at one or more locations with a resultant lack of emission and an overestimate of the number of variables to be solved. Despite these limitations, existing utility maps do provide a usable estimate. The personal experience base of operating personnel can provide additional information on the number of unknowns to be solved for and provision for user input could be made.

Optimal (Maximum likelihood, LMS, maximum entropy) solutions of the complete problem require that the solution of the navigation problem be integrated with the solution of the magnetic source inverse problem. Measurement noise exists in both the position measurements and in the magnetic and electric field measurements. Unless these error sources are treated together, unnecessary error will be introduced into the solution. Prior art solutions have added commercial navigation systems to existing utility locators.

Gradient strategies have limitations for several reasons. The interfering fields in any small volume are strongly correlated and therefore, are unlikely to behave like noise, and they will not average out (EMC). Additionally, local variations in permeability and conductivity can distort the field sensed by each of the coils, thereby resulting in location errors relative to the earth surface coordinate frame, like GPS (Field Distortion). The data from multi-point field sensor systems can be combined in many ways, such as by utilizing maximum likelihood, voting schemes, fuzzy logic, minimum entropy, MUSIC (Multiple Signal classification), SAM (Synthetic Aperture Magnetometry), least squares of independently estimated positions, and Kalman navigation filtering. The goal of the Kalman navigation filter is to map the path of the sewer pipe or other target utility, by incorporating all available information, such as length of push rod fed, model of camera push rod stiffness, etc.

As a drill string approaches the utility, it can induce a signal in the utility that can be detected by a current probe on the utility and verify that the drill string is either clearly above or below the utility. This information needs to be consistent with the multi-point field monitoring.

Many states now require, by law, potholing to expose any utility being crossed and a person stationed at the pothole.

An antenna array on the nozzle of a vacuum excavator provides the ability to place sensors below the surface of the ground. The combination of below ground, surface and above surface sensors is unique. The combination of fixed and moving sensors is unique and useful—it improves the resolution of drift in source strength versus motions of the receiver and source. In a typical vacuum excavator nozzle application, the coils would be in a replaceable nose piece. The processing electronics may include inclinometers, accelerometers, or tilt sensors so that if the excavation proceeds at some angle to the vertical, the position of the nose pieces may be calculated relative to a point above the surface being excavated. The processing electronics may include position sensors such as GPR/WAAS, range sensors such as a sonar, radar, or lidar to measure depth of penetration.

A short section of pipe connected to a pressurized water source is a commonly used low cost method of drilling short distances into dirt and tunneling under sidewalks and driveways. It has the distinct advantage over mechanical drilling in that the operator can sensitively feel utilities and stop advancing the tool. Equipped with a low lost set of coils that can be plugged into separate processing electronics, it becomes a very effective method of emplacing sensors at a buried utility, either on land or underwater, to very precisely locate the utility. The operator of the drill may then deviate the course of the drill or abandon the hole as needed. The waterjet emplaced coils may also be connected to electronics that automatically control the drill to deviate it around the utility.

Helicopter and aircraft mounted geophysical survey instruments are commercially available. Geophysical survey instruments generally treat pipeline and utility signals as interference. Current horizontal directional drilling operations typically use two operators, one to control the drill and one to move the locator. A typical task requires drilling under a freeway. A sensor set that can hover over traffic or land in the median provides an obvious advantage to the operating personnel, avoids having to shut down traffic, and at the same time allows a single operator to accomplish both tasks.

In some applications such as hazardous material dumps and minefields it may be difficult or hazardous for personnel to deploy sensors. In such situations, the sensors may be deployed by manned or remote controlled, fixed wing or rotary aircraft. The sensor may be used in flight or simply deployed on the ground. The sensor may be disposable or retrieved at a later time.

The airborne sensor may include a radar or lidar altimeter for calculation of burial depth from the measured range to sonde or utility. The airborne sensor may include GPS/WAAS, Doppler, inertial, and/or correlation navigation systems to allow multiple range bearing calculations to be made with a single sensor. Navigation capability also allows the preparation of accurate as built plans and the automated storage of plans in a Geographical Information System.

Oil and gas pipelines, telephone cables, fiber optic communication cables, power transmission lines, and mooring cables often coexist on and within congested river, lake, harbor, and ocean bottoms. Maintenance, repair or addition of new utilities in such situations requires the location of existing utilities during planning, operations, and final documentation (preparation of as-built) phases. Fixed sensors and sources may be attached to existing utilities. These sensors and sources can be powered by and communicate using the existing utility. These sensors may have independent power and/or communication and data storage capabilities. These sensors may communicate with moveable and/or moving sensors to provide optimal estimates of the absolute and relative locations of existing and new utilities in real time. The moving sensors may be deployed by submarine, ROV, diver or AUV. Sensors may communicate by hardwire, electromagnetic coupling, sonar or laser. Underwater communications lasers are usually green to take advantage of higher optical transparency in the green band. Underwater electromagnetic communications are usually in the ELF band at larger ranges, but frequencies above a megahertz may be used at very short ranges.

Such optical estimates may be derived by minimum least squares, norm minimization where the norm can be Sobolev, Kalman filtering, maximum likelihood or maximum entropy, Nelder Mead simplex search, or steepest descent search methods. In the complete solution, all measures of range, position, amplitude, phase, velocity, acceleration, tilt and frequency should be regarded as noisy data and subject to revision to produce a solution with minimum error over all parameters. In some cases, particularly with battery powered, hand held or autonomous vehicles, the full solution may be too computationally intensive. In such cases, optimization over subsets of the dataset may proceed independently to produce partial optimization. In particular, the navigation data may be optimized independently of the relative location data. Such computation may be performed by a single central processor or distributed over a network of processors.

A common problem faced in locating is the burial of multiple utilities in a single trench. This situation can be particularly confusing when the utilities have direct connections at multiple locations. Often little knowledge about where the connections are made is available. Prior art locating equipment has assumed that a single utility or sonde is producing the magnetic field. The inclusion of the ability to calculate distance traveled along some principally horizontal axis of a locator device can help interpret these situations. As long as the operator constrains the motion of the locator to be only pure translations along a single axis, useful information for solving the inverse problem for multiple sources may be gathered.

In the simplest version, measurements of a single magnetic field component in the locator device's local coordinate system would be measured at a series of points as the locator is moved. A numerical value computed from these measurements would be displayed on a display device as a function of position for interpretation by the user. The position can be measured by double integration from accelerations, by single integration from velocity, by time interpolation between fixed points, or in general by any of the navigation methods discussed in the navigation section of this disclosure. These values can also be sorted for later processing or transmitted. Navigational repeatability may be checked by placing way points on the ground and returning to the way points by performing a precise reversal of the original route. An alternate means to check the navigational accuracy is to stop at a way point and rotate the locator by 180° on a line perpendicular to the original navigation path. The processing means is then set to a closure test mode. In closure test mode, the processor checks that the original location of a way point is substantially the same as the current position. Closure may be checked by substracting distances calculated for accelerations or speeds from the accumulated distance. If the single axis of multiple frequency magnetic fields be measured, is tilted from the vertical, earth referenced components can be computed at navigational track crossings. A way point mode may be provided where forward motion is stopped and the locator is rotated at a fixed point in space to collect over determined data on the orientation of the multiple frequency magnetic field components. This over determined data may be used to both calibrate navigation devices, measurement devices, and simultaneously to calculate a least squares—best fit position, or more generally, a minimum norm position for several sondes and utilities.

A more capable version of the locator is to measure three components of the magnetic field in the locator coordinate system at each of a plurality of frequencies. Again, function of each of these components can be displayed versus distance traveled for interpretation by the user, transmitted for remote processing, or stored for later reference. In particular, it is useful to calculate and display total field strength, a horizontal component of the field strength, a vertical component of field strength, and elevation angle of the magnetic field, and the azimuthal orientation of the field strength at each of a plurality of frequencies. Such search coordinate referenced components may be trivially calculated from the instrument coordinate system, measurements with data from inclinometers, tilt sensors, or accelerometers residing within the locator.

A still more capable version of the single navigational sensor locator is to measure the components of the multi-frequency magnetic field at a plurality of locations in the locator. Mechanically, the simplest such arrangement is to provide an array of sensors along a natural vertical axis of the locator instrument so that as the instrument is moved along the sensitive axis of the navigational sensor, each magnetic field sensor makes multiple measurements along separated lines in space. Sensors with various sensing axes may be co-located at nodes along the vertical axis or distributed along the vertical axis or used in combinations of co-located and distributed sensors. In some mechanical packages it may be convenient to densely pack a number of sensors. In that case, it may be advantageous to measure the gradient components of the magnet field.

Means may be provided to the user to select a subset of the frequencies (or codes in the case of code division multiplexing or time slots or a combination thereof) to reduce the confusion on the screen. Means may be provided to select particular combinations of field components at each of the selected frequencies which are displayed versus distance. The distance axis may be arbitrarily scaled or warped. For example it may be useful to logarithmically compress or exponentially expand the distance axis when displaying some functions of the field to reveal particular details.

The distance from a sonde in a horizontal directional drill to the utility that is closest in the direction of travel may be displayed numerically and/or schematically in real time on electronically controlled display media such as a LED array, plasma panel, CRT, LCD, or electronic paper. The measured tilt of the drill string, the depth of the drill string, and the depth of each utility may be displayed in a paged format on a single display or multiple display devices may be used.

Another useful display mode is to project the path of the drill into the plane of the utility and display the vertical separation that would be achieved with the current tilt of the drill string.

Showing schematically the projections of all utilities surveyed in a particular area onto the plan perpendicular to the drill head sonde is another useful display mode. This mode is useful for visualizing at a glance whether the current drill path will miss all known utilities in a particular area. Means may be provided to download or enter coordinates of existing or planned utilities, mines, well, aquifers, dykes, sills, or general geological features manually or electronically from a database. Downloads may be accomplished via Bluetooth or other IEEE 802.11 (WiFi), IEEE 802.15 (ZigBee), IrDA or other wireless link formats, IEEE 802.4 (Ethernet), USB, RS-232 or other wired formats, or digital memory. Digital memory in the form of SDI, Compact Flash, and Smart Card are particularly convenient. A modification of this method is to show a selected subset of the measured, existing database, and planned utilities in an area projected onto the plan perpendicular to the drill head sonde. The subset may be selected by displaying only those utilities within a specified range, by displaying only the closest utilities up to some maximum number. The subset may be select by type: gas, water, electric, sewer, cable TV, telephone, fiber optic, reclaimed water, or unidentified.

If more than one drill is being operated in an area simultaneously the projected tracks of several drills may be shown projected onto the plane perpendicular to any particular drill. This display mode is particularly useful if the drill holes must be in some particular orientation relative to each other. In the case of drill holes that are made to collect gasses, leachates or seepage from a landfill or hazardous waste disposal facility, it may be advantageous to have a number of smaller collector lines intersect and connect with a large central main line. In the case of injection wells, maintaining separation between the lines may be more important so that the lines can be separately pressurized and monitored for flow. Such lines may be left unlined, selectively lined, or selectively lined with semipermeable and impermeable materials.

Having a single, principally horizontal navigation axis, while capable of novel tasks, imposes severe constrains on the user. Incorporation of additional sensors on each axis of motion and processing all of the sensors through a Kalman Filter will improve both the ease of use and the performance of the system.

Simply having a yaw axis sensor plus single axis distance measurement provides an enormous increase in the utility of the instrument. The user is no longer restricted to walking in straight lines for proper processing of the data. The user may instead walk in a circle or a FIG. 8. Navigational repeatability may be checked by placing waypoints on the ground and returning to the waypoint by a variety of routes. One embodiment is a locator with an elongate vertical axis and upper and lower antenna nodes. A pair of monostatic Doppler transceivers may be mounted at the approximate midpoint between the antenna nodes to minimize EMI. Alternatively, the Doppler sensors may be mounted at the lower end of the mapping locator to minimize the amount of transmit power needed and to maximize the Doppler frequency shift by using beam angle close to grazing incidence. A coriolis force gyro or a MEMS angular rate sensor may be placed anywhere along the elongate axis.

There exist on the market a number of nail, stud, and wiring locators. None of the devices are suitable for producing a map of the interior of the wall such as might be useful to architects and builders when planning remodeling and additional. In this embodiment, a mapping locator includes two ultrasonic or optical distance measuring devices with approximately perpendicular axes, differential capacitance sensors for studs, electrical antennas for live wires, and magnetic sensors for current carrying utilities and camera sondes. In normal use on a wall, one of the distance measuring sensors will measure the distance to a wall and one distance sensor will measure the distance to the floor or to the ceiling. A two axis accelerometer can be used to correct for the orientation of the mapping locator on the wall.

A particularly advantageous connection of transmitter to the plumbing system is to connect to the hot and cold water pipes at the outlet of the hot water heater. The dielectric isolator bushings in the hot water heater will keep most of the current in the building. If the transmitter waveform is asymmetrical in time, cold and hot water pipes can be distinguished inside walls by the direction of current flow relative to direction to the hot water heater. Alternatively, the transmitter and the mapping locator may be phase locked via an 801.11 link.

Another useful display projection is to display the measurement data overlaid on a photograph of a wall. In remodeling and renovation, drilling through wooden joists, forelocks, sills, and studs to pull new wiring is a common practice. Avoiding existing utilities is a well known problem. Addition of a small permanent magnet to existing flexible shank drills would allow the current system to be used. As long as the drill is spinning, the time varying magnetic field from the spinning magnet can be detected by the coils and processed to provide a location estimate of the drill. With the incorporation of static magnetic field sensors such as Hall effect, fluxgate, GMR, or GMI sensors, the drill position can be estimated with or without spinning. The acoustic or optical distance measuring sensors may be supplemented or replaced with encoder wheels or optical motion trackers. The data from the wall mapping locator may be continuously transmitted to t a portable computer for real time display or logged on solid state media such as SDI, Compact Flash, or Smart Card.

It is common practice in telephone and cable TV operations to occasionally fold cables back on themselves and incorporate a length of slack into a long run for future installation of a pedestal. Industry practice is to place a buried marker at slack loops to make them easier to find. However, not all slack loops have a marker and not all locators have a marker detection feature. Thus, there is a need for automatic detection of slack loops in a walkover locator. The physics behind such detection is relatively straight forward. If a current is induced in the cable, then over most of the length of the cable the magnetic field will be approximately cylindrical. Where a slack loop is incorporated, there will be a magnetic approximately dipole field at each end of the slack loop that is synchronous with and superimposed on the cylindrical field. Usually the magnetic dipole field associated is vertical, as the slack is buried with the turn around loops horizontal. Occasionally, the loops will be tilted or even vertical when a large bend radius cable slack loop is buried in a narrow trench. An alternate method of creating a slack loop in a utility is to bury a multi-turn coil. In that case only a single approximately dipole field will be associated with the slack loop.

While walking along the length of a buried cable run, the magnetic field will normally be horizontal and perpendicular to the direction of travel. Furthermore, the gradient of the magnitude will be directed straight down. As the dipoles associated with the slack loops are approached, the components of both the magnetic field and the gradient of the magnitude are distorted compared with the idealized cylindrical field. One method of recognizing these dipoles is to store the depth and measured tracing current of the utility in memory. This depth and current may be measured by the locator in an area away from the slack loop and stored into memory by a sequence of operator key presses.

On some utilities, such as cast iron sewer pipes, there is significant leakage of trace current into the ground even at low frequencies. This is particularly the case when there is no ground connection at points away from the transmitter along the utility and most of the current flowing is due to resistive or capacitive coupling off the surface of the utility to the earth. On long cables and at higher frequencies (400 kHz), significant capacitive currents flow through the jacket and the magnetic fields are better approximated by a conical field due to a linearly decreasing electric current. In the case of significant leakage along the length of a cable, a better model to use for the source field is a linearly decaying current along the length of the utility and an approximately conical shape for the resulting magnetic field. In such cases, better performance will be had by adjusting the nominal trace current as a function of time based on at least squares fit of a subset of measurement data to a magnetic field model of a linearly varying current source plus a dipole source plus return current in the earth.

Similarly, the depth of a utility may vary in a systematic fashion along its length. The utility may be a free flow pipe with a designed grade of a few degrees under level ground. The utility may be buried at an approximately constant depth under sloping or rolling terrain.

The depth may be entered from "as built" maps. Without navigation, a best fit of the output voltages from the coils can be made to a utility with known depth and electrical current. These distortions can be recognized by having more than three sensor coils within each node or by combining navigation information with the outputs of three or fewer coils.

The simplest locating situations are where there is a single sonde (dipole source0 or a single horizontal utility (electric current line source or cylindrical magnetic field). These fields have fewer than six free parameters. Other utilities such as cast iron pipes, ductile iron pipes, concentric neutral power lines, concentric neutral power lines with conductive polyethylene jackets will have fields that are better modeled as conical magnetic fields due to a linearly decreasing current immersed in a fairly uniform return flow. In highly conductive soils, the return flow may be come quite concentrated due to skin effect, especially at higher frequencies (100 kHz and up). If the walk over locator is sampling or continuously measuring approximations to components of the field, derivatives of the magnetic field, and/or integrals over the field so that more than six parameters are known, consistency with combinations of simple field models, can be checked. If the deviation from consistency exceeds some preset, or a user adjustable threshold is exceeded, an alarm indication may be made. In addition, a set of alternative models, such as sheath fault, slack loop, T connection, Elbow, two sub-parallel lines, three sub-parallel lines and combinations thereof may be tested for fit against the measured data. Test methods may be parameter fit, cross correlation, fuzzy logic, neural net, wavelet transform matching or similar means. What is unique, is the ability to automatically detect and/or display the type of model that fits the data best and to provide confidence bounds for the fit.

In one embodiment, the estimates of magnetic field vector and the magnetic field Jacobian may be measured at the top, middle, and bottom of an elongated axis of a locator instrument. The field itself is specified by three independent components, and the Jacobian has nine independent components so such a measurement constitutes 3×12=36 independent measurements at a single point and orientation in space. This is sufficient for robust discrimination between several locating scenarios. If, in addition, the locator has a navigation system, then 36 independent measurements of the magnetic field can be made at a plurality of locations.

Further improvement in the performance of such arrays of sensor coils may be had by measuring and/or calculating the interactions between coils and the failure of each coil to behave as a cosine response point receiver. Such calibration may be performed by rotating the array of coils in a very uniform field such as that produced by a large diameter Helmholtz coil. Alternatively, the coil interaction may be calculated by finite element, boundary element, or ATDT methods. A third method to calibrate the array of sensor coils is to provide a calibration frame supporting multiple small coil magnetic dipole sources in a known configuration. Each of the supported coils may be driven with a plurality of signals while the locator is moved near and/or within the calibration frame. This produces an over determined set of data from which the locator coil position, orientation, and frequency response may be determined by least squares fit, simulated annealing, simplex, or similar methods.

For best navigation results, the energy emitted by the navigation solenoids should be low frequency to avoid inducing significant current onto utilities within the markout or survey area. As a general guideline, frequencies lower than 10 kHz are appropriate for dipole source navigation. The same solenoid may be simultaneously operated at one or more higher frequencies to induce current into conductors buried within the earth or hidden within a wall. As a general guideline, signals with frequency content higher than 10 kHz are suitable for coupling onto elongate conductors. Little current is induced in elongate conductors that are approximately within a plane containing the dipole axis. Detection of such conductors can be enhanced by providing one or two additional, mutually orthogonal dipoles at several places in the markout area. The relative strength of coupling of the source dipole magnetic fields provides an estimate of the azimuth and elevation angles of the nearby conductors. The one or two additional dipoles also improve the navigational accuracy of the system. Very broadband codes can be used to drive 1, 2, or 3 of the solenoids in this configuration. The low frequency content of the codes can be used for navigation and the high frequency content for inducing current in concealed conductors. Such broadband codes can be designed to be approximately orthogonal to each other in signal space and at the same time to carry significant amounts of useful information such as the orientation and coordinates for the solenoid(s). Said coordinates may be measured by GPS, WAAS or DGPS. Said coordinates may be entered manually from information on corner markers or other survey means for coordination with the GCDM or Geographic Coordinate Data Base Project maintained by the Bureau of Land Management. Further utility of solenoid navigation devices may be gained by incorporation of radio transceivers into the design. Radio control of the solenoid amplitudes, frequencies, codes, and general operational status would allow substantial savings in battery consumption while improving performance by controlling "clutter" of the spectrum within a markout area.

For very broadband operation it is advantageous to use two coils on each axis with substantial leakage inductance isolating the pairs of coils. For example, the navigation coil may be a large diameter air coil and the utility current induction coil a small diameter ferrite core coil. The axes of these two coils may be parallel but substantially displaced to minimize coupling.

Because Rayleigh fading and terrain bias will effect each Doppler sensor type differently at different times, incorporating two or more Doppler sensors, such as acoustic plus lidar, in a given direction will improve the robustness of the system. Incorporation of accelerometers, MEMS gyros, and position fixing devices into the Kalman filter loop will further improve the stability and accuracy of the field mapping. Accelerometers may be used to gate out physically unreasonable Doppler estimated velocity changes. Such changes may be expected because the mapping locator will often be used outdoors and flying insects will pass through the Doppler beams and the velocity of the insect will be measured for a short time. If there is no measured acceleration change on the rising and falling edges of a velocity spike, it is reasonable to interpret the spike as interference and interpolate the velocities before and after the spike across the duration of the spike. An improved mapping locator is disclosed, utilizing and array of flux antennas employing multi-point field sampling in said locator to determine the location of objects of interest. Advances in numerical computing power (Moore's Law) allow the cost effective use of larger numbers of antenna coils compared to prior art cable locators.

The protection afforded our invention should only be limited in accordance with the following claims.

We claim:

1. A portable locator, comprising:
   a housing;
   an elongate support connected to the housing, the elongate support having an upper segment and a lower segment;
   at least one sensor node, the sensor node being connected to the elongate support and including at least three substantially mutually orthogonal coils;
   a structure that allows the sensor node to pivot relative to the housing including a hinge assembly joining the upper and lower segments of the elongate support; and
   processing circuitry at least partially mounted in the housing capable of receiving signals from the coils induced by electromagnetic emissions from a buried object, determining a location of the buried object, and providing an indication of the location.

2. The portable locator of claim 1 wherein the one sensor node is connected to the lower segment and the portable locator further comprises a second sensor node connected to the upper segment, the second sensor node including at least three substantially mutually orthogonal coils.

3. The portable locator of claim 1 wherein the three coils share a common center and an axis of the elongate support extends through the three coils.

4. The portable locator of claim 3 wherein the three coils are surrounded by a spherical shell.

5. The portable locator of claim 1 wherein each coil surrounds a corresponding ferrite core.

6. The portable locator of claim 1 wherein a pivot axis of the sensor node is substantially perpendicular to a longitudinal axis of the housing.

7. The portable locator of claim 1 wherein the three coils do not surround any ferrite cores.

8. The portable locator of claim 1 wherein the hinge assembly includes a lock mechanism.

9. The portable locator of claim 1 wherein the hinge assembly connects the elongate support to the housing.

10. A portable locator, comprising:
    a housing;
    an elongate support having an upper segment and a lower segment, an upper end of the upper segment being connected to the housing;
    first and second sensor nodes each including at least three substantially mutually orthogonal coils, the first sensor node being connected to the lower segment of the elongate support and the second sensor node being connected to the upper segment of the elongate support;
    a hinge assembly connecting the upper segment of the elongate support to the lower segment of the elongate support that allows the first sensor node to pivot relative to the second sensor node; and
    processing circuitry at least partially mounted in the housing capable of receiving signals from the coils induced by electromagnetic emissions from a buried object, determining a location of the buried object, and providing an indication of the location.

* * * * *

UNITED STATES PATENT AND TRADEMARK OFFICE
CERTIFICATE OF CORRECTION

PATENT NO.         : 7,443,154 B1                                    Page 1 of 1
APPLICATION NO.    : 11/970818
DATED              : October 28, 2008
INVENTOR(S)        : Ray Merewether and Mark S. Olsson It is certified that error appears in the above-identified patent and that said Letters Patent is hereby corrected as shown below:

On the cover of the patent, please insert the following item (30):

--           Related U.S. Application Data

Division of application No. 10/956,328 filed on October 1, 2004, now Patent No. 7,336,078, which claims benefit of provisional application No. 60/508,723 filed October 4, 2003. --

Signed and Sealed this

Eighteenth Day of August, 2009

David J. Kappos
*Director of the United States Patent and Trademark Office*